United States Patent [19]

Tanaka et al.

[11] Patent Number: 5,439,511
[45] Date of Patent: Aug. 8, 1995

[54] COATING VARNISH COMPOSITION AND ANTIFOULING COATING COMPOSITION

[75] Inventors: Hiroyuki Tanaka, Mito; Seiji Tai; Koichi Kamijima, both of Hitachi, all of Japan

[73] Assignee: Hitachi Chemical Company, Ltd., Tokyo, Japan

[21] Appl. No.: 180,348

[22] Filed: Jan. 12, 1994

[30] Foreign Application Priority Data

| Jan. 20, 1993 | [JP] | Japan | 5-007095 |
| Jan. 29, 1993 | [JP] | Japan | 5-013720 |
| Feb. 15, 1993 | [JP] | Japan | 5-025692 |
| Apr. 7, 1993 | [JP] | Japan | 5-079944 |
| Apr. 7, 1993 | [JP] | Japan | 5-079946 |
| Apr. 13, 1993 | [JP] | Japan | 5-085028 |
| Apr. 13, 1993 | [JP] | Japan | 5-085029 |
| Apr. 13, 1993 | [JP] | Japan | 5-085030 |
| May 28, 1993 | [JP] | Japan | 5-127101 |
| Oct. 5, 1993 | [JP] | Japan | 5-248388 |
| Nov. 25, 1993 | [JP] | Japan | 5-294818 |

[51] Int. Cl.$^6$ ............................................ C09D 5/14
[52] U.S. Cl. ........................ 106/18.32; 106/15.05; 106/18.31; 106/18.33; 106/18.34; 106/18.35; 424/78.09; 424/405; 424/630; 424/632; 424/635; 424/637; 424/638; 514/183; 514/222.2; 514/359; 514/361; 514/499; 514/500; 514/715; 514/724; 523/122
[58] Field of Search ............. 106/18.32, 18.33, 15.05, 106/18.31, 18.34, 18.35; 523/122; 514/499, 500, 183, 222.2, 359, 361, 715, 724; 424/78.09, 405, 630, 632, 635, 637, 638

[56] References Cited

U.S. PATENT DOCUMENTS 4,654,380  3/1987  Makepeace ............ 106/18.32

FOREIGN PATENT DOCUMENTS

| 0485213 | 5/1992 | European Pat. Off. . |
| 2137649 | 12/1972 | France . |
| 2-062614 | 12/1970 | Germany ............ 106/18.32 |
| 51-124130 | 10/1976 | Japan . |
| 57-092061 | 6/1982 | Japan . |
| 2-099567 | 4/1990 | Japan . |
| 86/02660 | 5/1986 | WIPO . |

*Primary Examiner*—Anthony Green
*Attorney, Agent, or Firm*—Antonelli, Terry, Stout & Kraus

[57] ABSTRACT

A coating varnish composition comprising (A) a polymer obtained by polymerizing (a) at least one unsaturated acid anhydride and (b) at least one other unsaturated monomer, and (B) at least one additive selected from triazole derivatives, benzothiazole derivatives, thiadiazole derivatives, polyethers and carboxylic acid anhydride derivatives, is capable of forming a coating which has no danger of poisoning like the organotin copolymers, shows a coating consuming property and antifouling performance comparable with those of the organotin copolymers and does not gel even when mixed with a copper compound.

11 Claims, No Drawings

COATING VARNISH COMPOSITION AND ANTIFOULING COATING COMPOSITION

BACKGROUND OF THE INVENTION

The present invention relates to a coating varnish composition and an antifouling coating composition to be used for preventing attachment of marine organisms to the underwater or submarine structures such as ships, fishing nets, drainage conduits, etc.

Numerous species of marine organisms, such as barnacle, ascidian, serpula, mussel, laver, etc., live in the seawater. When a structure such as a ship, fishing net, drainage pipe, etc., is set or placed in commission in or on the sea, the marine organisms cling to the structure and grow to give various kinds of damage to the structure. For instance, if the ship's bottom is incrusted with marine organisms, the frictional resistance of the seawater increases to cause a reduction of cruising performance of the ship, so that if it is tried to keep a constant cruising speed of the ship, its fuel consumption increases to pose a serious economical problem. Also, if the marine organisms cling to the fishing nets used for ocean culture, the meshes of the nets would be clogged up, which could prove fatal to the cultured fishes and shellfishes.

Hitherto, in order to prevent attachment of the marine organisms to the underwater structures such as mentioned above, the antifouling paints using homopolymers or copolymers of organotin-containing unsaturated monomers as resinous component (see Japanese Patent Examined Publication (JP-B)-40-21426, JP-B-44-9579, JP-B-46-13392, JP-B-49-20491, JP-B-51-11647, JP-B51-12049, JP-B-52-48170, etc.) have been applied on said structures. These polymers have their organotin portion hydrolyzed with the seawater (pH: 8.0–8.3). As a result, not only the organotin serves as an antifouling agent, but also the polymer surface which has been made soluble in seawater is gradually corroded by the moving sea water to bare out the new coating surface, thus producing a long-lasting stabilized antifouling effect. However, the organotin released into the seawater from the paints is hard to decompose and may be taken in by and accumulated in the marine organisms and, through the food chain, it may get into the human system. This involves the possibility of causing serious physical troubles such as deformity. So, use of the organotin compounds has been limited by law.

Request is now voiced in the art for the development of a resin for antifouling paints which is capable of producing a long-lasting stabilized antifouling effect, in place of the organotin-based resins which involve such a high order of danger. Ideally speaking, it is desirable that the resins used for antifouling paints are of a hydrolyzable type and show a pertinent coating consuming property like the organotin-based resins, but proposals involving use of hydrophilic or water-repellent resins have also been made (Japanese Patent Unexamined Publication (JP-A)-62-290768, JP-A-62-13471, JP-A-58-180565, JP-A-57-67672, etc.). However, it is hardly possible to realize a long-lasting stabilized antifouling effect by use of a resin having the hydrophilic or water-repellent property alone.

In view of the above, various hydrolyzable resins having a specific carboxylic acid ester in the side chain have been proposed (WO 84/02915, JP-A-2-69576, JP-A-63-215780, JP-B-55-39271, JP-A-62-57464, JP-B-61-3830, etc.), but their effect has not been well satisfactory.

On the other hand, JP-A-2-99567 proposes use of a copolymer of a maleic anhydride derivative for said purpose. This copolymer has no toxicity different from the organotin-based resins and can be expected to be excellent in coating consuming properties. However, this polymer, in use for an antifouling coating composition, had a serious defect in that it might cause thickening-gelation of the composition as it is mixed with a copper compound which is currently used as a poisonous substance.

Use of a triazole derivative for the purpose of preventing such thickening-gelation in the case of a composition comprising a polymer having a triorganotin group is reported (JP-A-57-92061). However, in case of using a polymer having a triorganotin group as base material, addition of a triazole derivative is of little avail, and it is impossible to obtain a good coating composition and to form a good coating.

SUMMARY OF THE INVENTION

The present invention is intended to solve the above problems of the prior art and to provide a coating varnish composition and an antifouling coating composition which have no poisonous action like the organotin copolymers, show a good coating consuming property well comparing with said organotin copolymers and do not gel even when mixed with a copper compound.

Specifically, the present invention provides a coating varnish composition comprising (A) a polymer obtained by polymerizing (a) at least one unsaturated acid anhydride and (b) at least one other unsaturated monomer copolymerizable therewith, and (B) at least one additive selected from the group consisting of triazole derivatives, benzothiazole derivatives, thiadiazole derivatives, polyethers and carboxylic acid anhydride derivatives.

The present invention further provides an antifouling coating composition comprising said coating varnish composition and an antifouling agent containing a copper compound as a major component.

DESCRIPTION OF THE PREFERRED EMBODIMENTS

The coating varnish composition according to the present invention comprises (A) a polymer obtained by polymerizing (a) at least one unsaturated acid anhydride and (b) at least one other unsaturated monomer copolymerizable therewith, and (B) at least one additive selected from the group consisting of triazole derivatives, benzothiazole derivatives, thiadiazole derivatives, polyethers and carboxylic acid anhydride derivatives.

Examples of the unsaturated acid anhydrides (a) usable in the present invention include maleic anhydride, methylmaleic anhydride, dimethylmaleic anhydride, ethylmaleic anhydride, diethylmaleic anhydride, chloromaleic anhydride, dichloromaleic anhydride, bromomaleic anhydride, dibromomaleic anhydride, itaconic anydride, 1-methylitaconic anhydride, 1,2-dimethylitaconic anhydride, 1-phenylmaleic anhydride, cyclopentenedicarboxylic acid anhydride, chlorocyclopentenedicarboxylic acid anhydride, nitrocyclopentenedicarboxylic acid anhydride, methylcyclopentenedicarboxylic acid anhydride, ethylcyclopentenedicarboxylic acid anhydride, dimethylcyclopentenedicarboxylic acid anhydride, diethylcyclopentenedicarboxylic acid anhydride, cyclohexenedicarboxylic acid anhydride, chlorocyclohexenedicarboxylic acid anhydride, nitrocyclohexanedicarboxylic acid anhydride, methylcyclohexenedicarboxylic acid anhydride, ethylcyclohexenedicarboxylic acid anhydride, dimethylcyclohexenedicarboxylic acid anhydride, diethylcyclohexenedicaboxylic acid anhydride, cycloheptenedicarboxy acid anhydride, bicyclo[2,2,1]heptenedicarboxylic acid anhydride, bicyclo[2,2,2]octenedicarboxylic acid anhydride, hexachlorobicyclo[2,2,1]heptenedicarboxylic acid anhydride, and 7-oxabicyclo[2,2,1]heptenedicarboxylic acid anhydride.

Among these unsaturated acid anhydrides, maleic anhydride, methylmaleic anhydride, dimethylmaleic anhydride, ethylmaleic anhydride, diethylmaleic anhydride, chloromaleic anhydride, dichloromaleic anhydride, bromomaleic anhydride, dibromomaleic anhydride, itaconic anhydride, 1-methylitaconic anhydride, 1,2-dimethylitaconic anhydride, and 1-phenylmaleic anhydride are preferred. Maleic anhydride is especially preferred.

The amount of the unsaturated acid anhydride(s) (a) used in the present invention may be optionally selected from between 1 and 50 mol %, preferably between 10 and 40 mol % based on the total amount of the monomers. When the amount of (a) is less than 1 mol %, it is hard to obtain a resin showing a well satisfactory coating consuming property, and when said amount exceeds 50 mol %, part of the unsaturated acid anhydride(s) remains unreacted in the polymerization reaction, which tends to give an adverse effect to stability of the coating.

Other unsaturated monomers (b) copolymerizable with (a), which are usable in the present invention, include those listed below.

It is recommended to use the unsaturated monomers represented by the following formula (I) as use of such unsaturated monomers contributes to further improvement of the properties such as hydrolyzability of the composition:

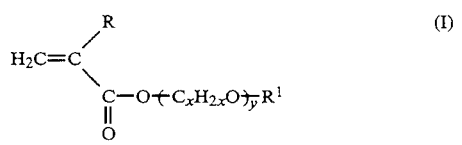

(I)

wherein R is a hydrogen atom or a methyl group; x is an integer of 1 to 6; y is an integer of 1 to 100; and $R^1$ is a straight, branched or cyclic alkyl, aryl or aralkyl group. Examples of the straight, branched or cyclic alkyl, aryl or aralkyl groups represented by R1 in the formula (I) include methyl, ethyl, propyl, isopropyl, butyl, isobutyl, sec-butyl, tert-butyl, pentyl, secpentyl, tert-pentyl, neopentyl, 2-ethylhexyl, cyclopropyl, cyclobutyl, cyclopentyl, cyclohexyl, phenyl, o-tolyl, m-tolyl, p-tolyl, 2,3-xylyl, 2,4-xylyl, o-cumenyl, m-cumenyl, p-cumenyl, mesityl, benzyl, phentyl, tolyl, naphthyl and norbornyl.

The unsaturated monomers of the formula (I) can be produced by various known synthetic methods. It is also possible to use the commercially available unsaturated monomers.

Listed below are the preferred examples of the compounds represented by the formula (I):

(1) $CH_2=C(R)COOCH_2CH_2OCH_3$
(2) $CH_2=C(R)COO(CH_2CH_2O)_2CH_3$
(3) $CH_2=C(R)COO(CH_2CH_2O)_3CH_3$
(4) $CH_2=C(R)COO(CH_2CH_2O)_4 CH_3$
(5) $CH_2=C(R)COO(CH_2CH_2O)_5CH_3$
(6) $CH_2=C(R)COO(CH_2CH_2O)_6CH_3$
(7) $CH_2=C(R)COO(CH_2CH_2O)_7CH_3$
(8) $CH_2=C(R)COO(CH_2CH_2O)_8CH_3$
(9) $CH_2=C(R)COO(CH_2CH_2O)_9CH_3$
(10) $CH_2=C(R)COO(CH_2CH_2O)_{10}CH_3$
(11) $CH_2=C(R)COO(CH_2CH_2O)_{12}CH_3$
(12) $CH_2=C(R)COO(CH_2CH_2O)_{14}CH_3$
(13) $CH_2=C(R)COO(CH_2CH_2O)_{16}CH_3$
(14) $CH_2=C(R)COO(CH_2CH_2O)_{18}CH_3$
(15) $CH_2=C(R)COO(CH_2CH_2O)_{20}CH_3$
(16) $CH_2=C(R)COO(C_3H_6O)CH_3$
(17) $CH_2=C(R)COO(C_3H_6O)_2CH_3$
(18) $CH_2=C(R)COO(C_3H_6O)_4 CH_3$
(19) $CH_2=C(R)COO(C_3H_6O)_6CH_3$
(20) $CH_2=C(R)COO(C_3H_6O)_8CH_3$
(21) $CH_2=C(R)COO(C_3H_6O)_{10}CH_3$
(22) $CH_2=C(R)COO(CH_2CH_2O)_2C_6H_{11}$
(23) $CH_2=C(R)COO(CH_2CH_2O)_2C_6H_5$

In the above formulae, R is hydrogen or methyl.

The ratio of the unsaturated monomer of the formula (I) in the composition is preferably 0.1 to 20 mol %, more preferably 0.5 to 15 mol % based on the whole amount of the monomers. When its ratio is less than 0.1 mol %, the effect of addition of this compound is almost nil, while when the ratio exceeds 20 mol %, stability of the coating tends to deteriorate.

In the present invention, one or more of the unsaturated monomers of the formula (I) are used.

As examples of the unsaturated monomers (b) other than those of the formula (I), which are usable in the present invention, the following can be cited: acrylic and methacrylic ester monomers such as methyl ester, ethyl ester, n-propyl ester, isopropyl ester, n-butyl ester, isobutyl ester, sec-butyl ester, tert-butyl ester, 2-ethylhexyl ester, octyl ester, nonyl ester, decyl ester, undecyl ester, dodecyl ester, tridecyl ester, tetradecyl ester, pentadecyl ester, hexadecyl ester, heptadecyl ester, octadecyl ester, nonadecyl ester, eicosyl ester, heneicosy ester, docosyl ester, cyclohexyl ester, benzyl ester, phenyl ester, dimethylmonoethyl ester, dimethylaminopropyl ester, 2-chloroethyl ester, 2,2,2-trichloroethyl ester, 2-fluoroethyl ester, 2,2,2-trifluoroethyl ester, 2-cyanoethyl ester, trimethylsilyl ester, triethylsilyl ester, tripropylsilyl ester, tributylsilyl ester, trihexylsilyl ester, trimethoxysilyl ester, triethoxysilyl ester, tripropoxysilyl ester, tributoxysilyl ester, trihexyloxysilyl ester, triphenylsilyl ester and triphenoxysilyl ester of acrylic and methacrylic acids; styrene and styrene monomers such as α-methylstyrene and p-t-butylstyrene; vinyl monomers such as vinyl chloride and vinyl acetate; and nitrile monomers such as acrylonitrile and methacrylonitrile. Among these unsaturated monomers, methyl ester, ethyl ester, n-propyl ester, isopropyl ester, n-butyl ester, isobutyl ester, sec-butyl ester, tert-butyl ester, 2-ethylhexyl ester, dodecyl ester, cyclohexyl ester and benzyl ester of acrylic or methacrylic acid, and styrene are preferred.

The blending ratio of the unsaturated monomer (b) is preferably 50 to 99 mol % based on the whole amount of the monomers including the unsaturated monomer of the formula (I). When its ratio is less than 50 mol %, the produced resin composition may prove poor in water resistance. When said ratio exceeds 99 mol %, the produced composition may turn out unsatisfactory in coating consuming property.

The ratio of the unsaturated monomer (b) other than those of the formula (I) is preferably 30 to 98.9 mol %, more preferably 50 to 89.5 mol % based on the whole amount of the monomers.

In the present invention, polymer preparation can be accomplished by any suitable method such as adding dropwise a solution containing monomer (b) and a radical polymerization catalyst into a solvent solution of unsaturated acid anhydride (a). Reaction temperature is usually around 0° to 180° C., preferably around 40° to 170° C. The time used for dropwise addition in the polymerization reaction is usually 1 to 10 hours, preferably 2 to 6 hours. The organic solvent used in the reaction process is preferably one which is unreactive to the unsaturated acid anhydride and low in hydrophilicity. An aromatic solvent such as xylene or toluene is especially preferred.

As for the radical polymerization catalyst used in polymer preparation in the present invention, it is possible to employ the radical polymerization initiators used for ordinary radical polymerization. Typical examples of such catalysts are 2,2'-azobis(4-methoxy-2,4-dimethylvaleronitrile), 2,2'-azobis(cyclopropylpropionitrile), 2,2'-azobis(2,4-dimethylvaleronitrile), 2,2'-azobis(isobutylonitrile), 2,2'-azobis(2-methylbutylonitrile), 1,1'-azobis(cyclohexane-1-carbonitrile), 2-phenylazo-4-methoxy-2,4-dimethylvaleronitrile, benzoyl peroxide and di-tert-butyl peroxybenzoate.

The amount of the polymerization initiator used in the process of this invention is not specified, but it is preferably 0.1 to 5 wt %, more preferably 0.2 to 4 wt % based on the whole amount of monomers.

The number-average molecular weight of the obtained polymer is not specified, but in view of the properties of the produced coating resin, it is preferably 3,000 to 200,000, more preferably 5,000 to 50,000. The number-average molecular weight shown herein is the value determined by measuring the molecular weight according to gel permeation chromatography and reducing it according to a standard polystyrene calibration curve.

An appropriate chain transfer agent may be blended in the course of polymerization for the purpose of adjusting the molecular weight. Examples of the chain transfer agents usable for said purpose include methanethiol, ethanethiol, n-propanethiol, isopropanethiol, n-butanethiol, 2-methylpropanethiol, 3-methylpropanethiol, 1,1-dimethylethanethiol, 1-hexanethiol 1-octanethiol, 1-decanethiol, benzenethiol, 2-methylbenzenethiol, 3-methylbenzenethiol, 4-methylbenzenethiol, 2-ethylbenzenethiol, 3-ethylbenzenethiol, 4-ethylbenzenethiol, bis(4-hydroxydimethylphenyl) disulfide, bis(2-chloromethylphenyl) disulfide, bis(2-bromomethylphenyl) disulfide, dinaphthyl disulfide, di-2-benzothia disulfide, α-methylstyrene dimer, carbon tetrachloride, carbon tetrabromide and chloroform. The amount of the chain transfer agent to be blended may be properly selected according to the molecular weight of the polymer to be produced.

The amount of the solvent used in the polymerization reaction is not specified, but usually it is about ½ to 2 times by mass the whole amount of monomers.

Polymerization is usually carried out in an inert gas atmosphere. Nitrogen, argon, helium, neon or the like can be used as inert gas.

Now, the additive(s) (B) to be added to a solution of said polymer (A) is described.

The triazole derivatives usable as additive (B) include benzotriazole derivatives, amino-substituted triazole derivatives and other triazole derivatives.

Examples of benzoatriazole derivatives are 1,2,3-benzotriazole, 1-methyl-1,2,3-benzotriazole, 1-phenyl-1,2,3-benzotriazole, 2-phenyl-1,2,3-benzotriazole, 4-chloro-1,2,3-benzotriazole, 4-nitro-1,2,3-benzotriazole, 5-methyl-1,2,3-benzoatriazole, 5-ethyl-1,2,3-benzotriazole, 5-propyl-1,2,3-benzotriazole, 5-isobutyl-1,2,3-benzoatriazole, 5-methoxy-1,2,3-benzotriazole, 5-chloro-1,2,3-benzotriazole, 5,6-dimethyl-1,2,3-benzotriazole, 1,2,3-benzotriazolecarboxylic acid and its ester derivatives, and N-dialkylaminomethyl-1,2,3-benzotriazole. Examples of amino-substituted triazole derivatives are 4-amino-1,2,4-triazole and 3-amino-1H-1,2,4-triazole.

Examples of other triazole derivatives include alkyl, aryl, aralkyl, halogen and hydroxy-substituted triazole derivatives such as 1,2,3-triazole, 1-methyl- 1,2,3-triazole, 1-phenyl-1,2,3-triazole, 1-benzyl-1,2,3-triazole, 2-methyl-1,2,3-triazole, 2-phenyl-1,2,3-triazole, 2-benzyl-1,2,3-triazole, 4-methyl-1,2,3-triazole, 4-phenyl-1,2,3-triazole, 4-hydroxy-1,2,3-triazole, 4,5-dimethyl-1,2,3-triazole, 4-methyl-2-phenyl-1,2,3-triazole, 4,5-dimethyl-2-phenyl-1,2,3-triazole, 1,5-diphenyl-1,2,3-triazole, 1,2,4-triazole, 1-methyl-1,2,4-triazole, 1-phenyl-1,2,4-triazole, 3-methyl-1,2,4-triazole, 3-phenyl-1,2,4-triazole, 3-chloro-1,2,4-triazole, 3-bromo-1,2,4-triazole, 3,5-dimethyl-1,2,4-triazole, 3,5-diethyl-1,2,4-triazole, 1,3-diphenyl-1,2,4-triazole, 1,5-diphenyl-1,2,4-triazole and 3,5-diphenyl-1,2,4-triazole.

As benzothiazole derivatives for additive (B), sulfur-substituted benzothiazole derivatives are preferred. Examples of such derivatives are 2-mercapto benzothiazole, benzothiazyl disulfide, N-oxydiethylenebenzothiazole-2-sulfenamide, N,N-dicyclohexylbenzothiazole-2-sulfenamide, 3-(2-benzothiazylthio)propionic acid and (2-benzothiazylthio)acetic acid.

As thiadiazole derivatives, sulfur-substituted thiadizole derivatives are preferred. Examples thereof are 2-mercapto-1,3,4-thiadiazole, 2,5-dimercapto-1,3,4-thiadiazole, 2-amino-5-mercapto-1,3,4-thiadiazole, 2-methyl-5-mercapto-1,3,4-thiazole, 2-methylamino-5-mercapto-1,3,4-thiadiazole and 2-thioaceto-5-mercapto-1,3,4-thiadiazole.

As polyethers to be used as additive (B), generally known straight or branched polyethers and cyclic polyethers can be used. Examples of such polyethers are ethylene glycol dimethyl ether, ethylene glycol diethyl ether, ethylene glycol dibutyl ether, ethylene glycol diallyl ether, ethylene glycol divinyl ether, ethylene glycol diglycidyl ether, ethylene glycol diacrylate, ethylene glycol dimethacrylate, ethylene glycol diacetate, ethylene glycol dibenzoate, ethylene glycol di-p-tosylate, propylene glycol dimethyl ether, propylene glycol diethyl ether, propylene glycol dibutyl ether, propylene glycol diallyl ether, propylene glycol divinyl ether, propylene glycol diglycidyl ether, propylene glycol diacrylate, propylene glycol dimethacrylate, propylene glycol diacetate, propylene glycol dibenzoate, propylene glycol di-p-tosylate, butylene glycol diethyl ether, butylene glycol dibutyl ether, butylene glycol diallyl ether, butylene glycol divinyl ether, butylene glycol diglydicyl ether, butylene glycol diacrylate, butylene glycol dimethacrylate, butylene glycol diacetate, butylene glycol dibenzoate, butylene .glycol di-p-tosylate, pentylene glycol dimethyl ether, pentylene glycol diethyl ether, pentylene glycol dibutyl ether, pentylene glycol, diacrylate, pentylene glycol dimethacrylate, pentylene glycol diacetate, pentylene glycol dibenzoate, pentylene glycol di-p-tosylate, hexylene glycol dimethyl ether, hexylene glycol diethyl ether, hexylene glycol dibutyl ether, hexylene glycol diacrylate, hexylene glycol dimethacrylate, hexylene glycol diacetate, hexylene glycol dibenzoate, hexylene glycol di-p-tosylate, heptylene glycol dimethyl ether, heptylene glycol diethyl ether, heptylene glycol dibutyl ether, heptylene glycol diacrylate, heptylene glycol dimethacrylate, heptylene glycol diacetate, heptylene glycol dibenzoate, heptylene glycol di-p-tosylate, diethylene glycol dimethyl ether, diethylene glycol diethyl ether, diethylene glycol dibutyl ether, diethylene glycol diallyl ether, diethylene glycol divinyl ether, diethylene glycol diglycidyl ether, diethylene glycol diacrylate, diethylene glycol dimethacrylate, diethylene glycol diacetate, diethylene glycol dibenzoate, diethylene glycol di-p-tosylate, dipropylene glycol dimethyl ether, dipropylene glycol diethyl ether, dipropylene glycol dibutyl ether, dipropylene glycol diallyl ether, dipropylene glycol divinyl ether, dipropylene glycol diglycidyl ether, dipropylene glycol diacrylate, dipropylene glycol dimethacrylate, dipropylene glycol diacetate, dipropylene glycol dibenzoate, dipropylene glycol di-p-tosylate, triethylene glycol dimethyl ether, triethylene glycol diethyl ether, triethylene glycol dibutyl ether, triethylene glycol diallyl ether, triethylene glycol divinyl ether, triethylene glycol diglycidyl ether, triethylene glycol diacrylate, triethylene glycol dimethacrylate, triethylene glycol diacetate, triethylene glycol dibenzoate, triethylene glycol di-p-tosylate, tripropylene glycol dimethyl ether, tripropylene glycol diethyl ether, tripropylene glycol dibutyl ether, tripropylene glycol diallyl ether, tripropylene glycol divinyl ether, tripropylene glycol diglycidyl ether, tripropylene glycol diacrylate, tripropylene glycol dimethacrylate, tripropylene glycol diacetate, tripropylene glycol dibenzoate, tripropylene glycol di-p-tosylate, tetraethylene glycol dimethyl ether, tetraethylene glycol diethyl ether, tetraethylene glycol dibutyl ether, tetraethylene glycol diallyl ether, tetraethylene glycol divinyl ether, tetraethylene glycol diglycidyl ether, tetraethylene glycol diacrylate, tetraethylene glycol dimethacrylate, tetraethylene glycol diacetate, tetraethylene glycol dibenzoate, tetraethylene glycol di-p-tosylate, pentaethylene glycol dimethyl ether, pentaethylene glycol diethyl ether, pentaethylene glycol dibutylether pentaethylene glycol diallyl ether, pentaethylene glycol divinyl ether, pentaethylene glycol diglycidyl ether, pentaethylene glycol diacrylate, pentaethylene glycol dimethacrylate, pentaethylene glycol diacetate, pentaethylene glycol dibenzoate, pentaethylene glycol di-p-tosylate, methacrylic acid nonaethylene glycol monomethyl ether, 12-crown-4, 15-crown-5, 18-crown-6, 21-crown-7, 24-crown-8, 30-crown-10, 60-crown-6, dibenzo-14-crown-4, benzo-15-crown-5, benzo-18-crown-6, dibenzo-18-crown-6, dibenzo-21-crown-7, dibenzo-24-crown-8, dibenzo-30-crown-10, dibenzo-60-crown-6, tribenzo-18-crown-6, tribenzo-24-crown-8, dicyclohexyl-18-crown-6, 2,4-diketo(13-crown-4), 2,4-diketo(16-crown-5) and 2,4-diketo(19-crown-6).

As carboxylic acid anhydride derivatives for additive (B), there can be used any of the generally known carboxylic acid anhydride derivatives, which include cyclobutanedicarboxylic acid anhydride, cyclopentanedicarboxylic acid anhydride, cyclohexanedicarboxylic acid anhydride, chlorocyclohexanedicarboxylic acid anhydride, nitrocyclohexanedicarboxylic acid anhydride, methylcyclohexanedicarboxylic acid anhydride, ethylcyclohexanedicarboxylic acid anhydride, dimethylcyclohexanedicarboxylic acid, diethylcyclohexanedicarboxylic acid anhydride, cycloheptanedicarboxylic acid anhydride, cyclopentenedicarboxylic acid anhydride, chlorocyclopentenedicarboxylic acid anhydride, nitrocyclopentenedicarboxylic acid anhydride, methylcyclopentenedicarboxylic acid anhydride, ethylcyclopentenedicarboxylic acid anhydride, dimethylcyclopentenedicarboxylic acid anhydride, diethylcyclopentenedicarboxylic acid anhydride, cyclohexenedicarboxylic acid anhydride, chlorocyclohexenedicarboxylic acid anhydride, nitrocyclohexenedicarboxylic acid anhydride, methylcyclohexenedicarboxylic acid anhydride, ethylcyclohexenedicarboxylic acid anhydride, dimethylcyclohexenedicarboxylic acid anhydride, diethylcyclohexenedicarboxylic acid anhydride, cycloheptenedicarboxylic acid anhydride, bicyclo[2,2,1]heptanedicarboxylic acid anhydride, bicyclo[2,2,1]octanedicarboxylic acid anhydride, hexachloro-bicyclo[2,2,1]heptanedicarboxylic acid anhydride, 7-oxabicyclo[2,2,1]heptanedicarboxylic acid anhydride, bicyclo[2,2,1]heptenedicarboxylic acid anhydride, bicyclo[2,2,2]octenedicarboxylic acid anhydride, hexachloro-bicyclo[2,2,1]heptenecarboxylic acid anhydride, 7-oxabicyclo[2,2,1]heptenedicarboxylic acid anhydride, succinic anhydride, methylsuccinic anhydride, dimethylsuccinic anhydride, trimethylsuccinic anhydride, ethylsuccinic anhydride, diethylsuccinic anhydride, ethylmethylsuccinic anhydride, chlorosuccinic anhydride, dichlorosuccinic anhydride, bromosuccinic anhydride, dibromosuccinic anhydride, glutaric anhydride, methylglutaric anhydride, dimethylglutaric anhydride, ethylglutaric anhydride, diethylglutaric anhydride, ethylmethylglutaric anhydride, 3,3-tetramethyleneglutaric anhydride, chloroglutaric anhydride, dichloroglutaric anhydride, bromoglutaric anhydride, dibromoglutaric anhydride, 3-trimethylsiloxyglutaric anhydride, 3-triethylsiloxyglutaric anhydride, 3-tripropylsiloxyglutaric anhydride, 3-tributylsiloxyglutaric anhydride, 3-trihexylsiloxyglutaricanhydride, 3-t-butyldimethylsiloxyglutaric anhydride, 3-phenylsiloxyglutaric anhydride, 3-trimethoxysiloxyglutaricanhydride, 3-triethoxysiloxyglutaric anhydride, 3-tripropoxysiloxyglutaric anhydride, 3-tributoxylsiloxyglutaric anhydride, 3-trihexyloxysiloxyglutaric anhydride, 3-phenoxysiloxyglutaric anhydride, maleic anhydride, methylmaleic anhydride, dimethylmaleic anhydride, ethylmaleic anhydride, diethylmaleic anhydride, chloromaleic anhydride, dichloromaleic anhydride, bromomaleic anhydride, dibromomaleic anhydride, itaconic anhydride, aconitic anhydride, camphoricanhydride, diglycolic anhydride, 4,5-imidazoledicarboxylic acid anhydride, 2,5-oxazolidinedione, diacetyltartaric anhydride, and 3,5-diacetyltetrahydropyran-2,4,6-trione.

Additive (B) is preferably selected from triazole derivatives, polyethers and carboxylic acid anhydrides because of high effect. More preferably, additive (B) is selected from triazole derivatives and polyethers. Triazole derivatives are especially preferred. Of the triazole derivatives, the most preferred compounds for use as additive (B) are 1,2,3-benzotriazole, 1,2,4-triazole and 3-amino-1H-1,2,4-triazole.

One or more of these additives (B) may be used, but the amount thereof added to the polymer solution is preferably within the range of 0.01 to 50 wt % based on the polymer (A) (resin solids). When the amount added is less than 0.01 wt %, the effect of addition of the additive(s) (B) is unsatisfactory, and thickening of the composition tends to take place due to mixing with a copper compound. When the content of additive (B)

exceeds 50 wt %, it is hardly possible to form a good coating.

The more preferred content of additive (B) varies depending on the type of additive (B) used, but in the case of a triazole derivative, benzothiazole derivative, thiadiazole derivative or polyether, such additive is preferably used in an amount of 0.1 to 50 wt % based on polymer (A). In the case of a carboxylic acid anhydride derivative, it is preferably used in an amount of 0.01 to 10 wt %,, more preferably 0.1 to 5 wt %, based on the weight of the polymer (A).

The coating varnish composition according to the present invention may contain other polymer (S) than (A) within limits not prejudicial to the effect of the present invention.

Further, in said coating varnish composition, there may be blended a colorant such as a known pigment, a known antifouling agent and various other additives (bulk filler, dispersion-preventive or anti-sag agent, etc.) to obtain an antifouling coating composition.

The antifouling agent used in the antifouling coating composition of the present invention is preferably one mainly composed of a copper compound which is an inorganic antifouling substance. The copper compounds usable for this purpose include cupric chromate, cupric ferrocyanate, cupric quinoline, cupric α-hydroquinone, cupric oleate, cupric nitrate, cupric phosphate, cupric tartarate, cuprous oxide, copper rhodanide, copper-nickel solid solution alloy, cuprous iodide and cuprous sulfite.

The amount of the copper compound is not particularly limited, but it is preferable to use in an amount of 50 to 100% by weight, more preferably 70 to 100% by weight, based on the weight of the total antifouling agents.

Among other typical inorganic antifouling agents are zinc oxide, zinc chromate and strontium chromate. Examples of organic antifouling agents are 2,4,5,6- tetrachloroisophthalonitrile, N,N-dimethyldichlorophenylurea, 4,5-dichloro-2-n-octyl-3(2H)-isothiazolone, zinc methyldithiocarbamate, 2-methylthio-4-t-butylamino-6-cyclopropylamino-s-triazine, N-(fluorodichloromethylthio)phthalimide, N,N'-dimethyl-N'-phenyl-(N-fluorodichloromethylthio)sulfamide, 2-pyridinethiol-1-oxide zinc salt, tetramethylthiuram disulfide, 2,4,6-trichlorophenylmalemide, 2,3,5,6-tetrachloro-4-(methylsulfonyl)pyridine, 3-iodo-2-propinylbutyl carbamate, diiodomethylparatolysulfone, bisdimethyldithiocarbamoylzincethylenebis dicarbamate, and pyridinetriphenylborane.

It is also possible to use a combination of an organotin compound, a triazine compound, an organosulfurous compound and/or other substance(s) as an antifouling agent.

The amount of such antifouling agent blended in the composition is not specified, but it is preferably 1 to 500 wt %, more preferably 50 to 450 wt % based on the whole amount of polymer (resin solids). When the amount of the antifouling agent is less than 1 wt %, its effect is almost nil, and when the amount exceeds 500 wt %, it is hard to form a good coating.

Pigments usable in this invention include inorganic pigments such as titanium oxide (titanium white), iron oxide and carbon black and organic pigments such as azo, cyanine, phthalocyanine and quinacridone pigments, but usually inorganic pigments are used. Pigment is used when necessary. When used, its amount is not specified but preferably not more than 200 wt % based on the whole amount of polymer (resin solids). When the pigment content exceeds 200 wt %, the coating formed with the composition tends to deteriorate in stability.

Examples of bulk filler usable in this invention are calcium carbonate, barium sulfate, magnesium oxide, alumina, and zeolite. Bulk filler can be used when necessary. When used, its amount is not specified but preferably in a range not exceeding 100 wt % based on the whole amount of polymer (resin solids). When the filler contents exceeds 100 wt %, stability of the coating tends to deteriorate.

As dispersion-preventive or anti-sag agent, there can be used the inorganic agents of various types such as silica gel-, bentonite-, kaolinite-, talc-, hectorite-, montmorillonite-, saponite- and beidellite-based agents, and the organic agents such as fatty acid amide-, fatty acid ester-, polyethylene oxide-, sulfuric ester-based anionic surfactants, polycarboxylic acid amine salt-, polycarboxylic acid-, polyamide-, polymeric polyether-, acrylic copolymer- and specific silicon-based agents. The amount of the agent to be blended is not specified but preferably in the range of 0.01 to 100 wt % based on the polymer (A) (resin solids). When the blended amount of the agent is less than 0.01 wt %, the effect of addition thereof is not derived to a satisfactory degree, and when the amount exceeds 100 wt %, the coat stability tends to deteriorate.

It is possible to further add rosin, gum rosin, wood rosin, tall oil rosin or the like as elusion assistant.

The antifouling coating composition of the present invention obtained in the manner described above is useful as ship bottom paint, paint for fishing nets, etc.

The present invention is further described below with reference to the examples of the invention, which examples however do not limit the present invention in any way. In the following descriptions of Examples, "coating varnish (composition)" is referred to simply as "varnish (composition)" and "antifouling coating composition" as "coating composition".

EXAMPLE 1

Into a four-necked flask equipped with a stirrer, a condenser, an $N_2$ gas feed pipe, a dropping funnel and a thermometer, 75.0 g of xylene and 16.89 g of maleic anhydride were supplied and stirred at 95° C. Then a mixture of 81.62 g of n-butyl methacrylate, 51.5 g of n-butyl acrylate and 0.375 g of 2,2'-azobis(isobutylonitrile) (hereinafter abbreviated as AIBN) was added dropwise with stirring into the flask in an $N_2$ gas stream over a period of 3 hours. After the dropwise addition was completed, the mixture was further stirred at 95° C. for one hour. Then, a mixture of 15.0 g of xylene and 0.30 g of AIBN was added dropwise into the flask over a period of one hour, after which the mixture was kept at 95° C. for 30 minutes and then mixture of 15.0 g of xylene and 0.3 g of AIBN was further added dropwise thereto over a period of 30 minutes. Thereafter, the mixture was kept at 95° C. for 2 hours, followed by addition of 45.0 g of xylene and cooling. To the resultant reaction mixture, 4.5 g of 1,2,3-benzoatriazole was added and mixed well to produce a varnish composition. The number-average molecular weight of the obtained polymer was 32,000.

EXAMPLE 2

Into a four-necked flask equipped with a stirrer, a condenser, an $N_2$ gas feed pipe, a dropping funnel and a thermometer, 62.5 g of xylene and 29.13 g of maleic anhydride were supplied and stirred at 95° C. Then a mixture of 70.39 g of n-butyl methacrylate, 25.37 g of n-butyl acrylate, 1.25 g of AIBN and 1.0 g of α-methylstyrene dimer was added dropwise with stirring into the flask in an $N_2$ gas stream over a period of 4 hours. After the dropwise addition was completed, the mixture was further stirred at 95° C. for one hour. Then a mixture of 12.5 g of xylene and 0.25 g of AIBN was added dropwise into the flask over a period of one hour, after which the mixture was kept at 95° C. for 30 minutes and a mixture of 12.5 g of xylene and 0.25 g of AIBN was further added dropwise over a period of 30 minutes. Thereafter, the mixture was kept at 95° C. for 2 hours, followed by addition of 37.5 g of xylene and cooling. To the resultant reaction mixture, 3.75 g of 1,2,3-benzotriazole was added and mixed well to produce a varnish composition. The number-average molecular weight of the obtained polymer was 12,700.

EXAMPLE 3

Into a four-necked flask equipped with a stirrer, a condenser, an $N_2$ gas feed pipe, a dropping funnel and a thermometer, 75.0 g of xylene and 22.55 g of maleic anhydride were supplied and stirred at 95° C. Then a mixture of 98.12 g of n-butyl methacrylate, 29.47 g of n-butyl acrylate, 1.50 g of AIBN and 0.75 g of α-methylstyrene dimer was added dropwise with stirring into the flask in an $N_2$ gas stream over a period of 4 hours. After the dropwise addition was completed, the mixture was further stirred at 95° C. for one hour. Then, a mixture of 15.0 g of xylene and 0.30 g of AIBN was added dropwise over a period of one hour and the mixture was kept at 95° C. for 30 minutes, after which a mixture of 15.0 g of xylene and 0.30 g of AIBN was further added dropwise over a period of 30 minutes. Thereafter, the mixture was kept at 95° C. for 2 hours, followed by addition of 45.0 g of xylene and cooling. To the resultant reaction mixture, 4.5 g of 1,2,3-benzotriazole was added and mixed well to produce a varnish composition. The number-average molecular weight of the obtained polymer was 13,800.

EXAMPLE 4

Into a four-necked flask equipped with a stirrer, a condenser, an $N_2$ gas feed pipe, a dropping funnel and a thermometer, 75.0 g of xylene and 22.75 g of maleic anhydride were supplied and stirred at 95° C. Then a mixture of 82.48 g of n-butyl methacrylate, 44.60 g of n-butyl acrylate, 1.50 g of AIBN and 0.75 g of α-methystyrene dimer was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour and the mixture was kept at 95° C. for 30 minutes, after which a mixture of 15.0 g of xylene and 0.30 g of AIBN was added dropwise over a period of 30 minutes. Thereafter, the mixture was kept at 95° C. for 2 hours, followed by addition of 45.0 of xylene and cooling. To the resultant reaction mixture, 4.5 g of 1,2,3-benzotriazole was added and mixed well to produce a varnish composition. The number-average molecule weight of the obtained polymer was 15,100.

EXAMPLE 5

Into a four-necked flask equipped with a stirrer, a condenser, an $N_2$ gas feed pipe, a dropping funnel and a thermometer, 250 g of xylene and 77.7 g of maleic anhydride were supplied and stirred at 95° C. Then a mixture of 169 g of n-butyl methacrylate, 253 g of n-butyl acrylate and 1.67 g of AIBN was added dropwise with stirring into the flask in an $N_2$ gas stream over a period of 3 hours. After the dropwise addition was completed, the mixture was further stirred at 95° C. for one hour. Then a mixture of 50.0 g of xylene and 1.00 g of AIBN was added dropwise over a period of one hour. The mixture was kept at 95° C. for 30 minutes and then a mixture of 50.0 g of xylene and 1.00 g of AIBN was further added dropwise over a period of 30 minutes. Thereafter, the mixture was kept at 95° C. for 2 hours, followed by addition of 150 g of xylene and cooling. To the resultant reaction mixture, 15 g of 1,2,4-triazole was added and mixed well to produce a varnish composition. The number-average molecular weight of the obtained polymer was 16,300.

EXAMPLE 6

Into a four-necked flask equipped with a stirrer, a condenser, an $N_2$ gas feed pipe, a dropping funnel and a thermometer, 300 g of xylene and 95.2 g of maleic anhydride were supplied and stirred at 95° C. Then a mixture of 69.1 g of n-butyl methacrylate, 436 g of n-butyl acrylate and 6.00 g of AIBN was added dropwise with stirring into the flask in an $N_2$ gas stream over a period of 3 hours. After the dropwise addition was completed, the mixture was further stirred at 95° C. for one hour. Then a mixture of 60.0 g of xylene and 1.2 g of AIBN was added dropwise over a period of one hour, after which the mixture was kept at 95° C. for 30 minutes and then a mixture of 60.0 g of xylene and 1.2 g of AIBN was added dropwise over a period of 30 minutes. Thereafter, the mixture was kept at 95° C. for 2 hours, then 180 g of xylene was added, followed by cooling. To the resultant reaction mixture, 18 g of 1,2,4-triazole was added and mixed well to produce a varnish composition. The number-average molecular weight of the obtained polymer was 12,500.

EXAMPLE 7

Into a four-necked flask equipped with a stirrer, a condenser, an $N_2$ gas feed pipe, a dropping funnel and a thermometer, 375 g of xylene and 181 g of maleic anhydride were supplied and stirred at 95° C. Then a mixture of 175 g of n-butyl methacrylate, 394 g of n-butyl acrylate and 2.50 g of AIBN was added dropwise with stirring into the flask in an $N_2$ gas stream over a period of 4 hours. After completion of the dropwise addition, the mixture was further stirred at 95° C. for one hour. Then a mixture of 75.0 g of xylene and 1.50 g of AIBN was added dropwise over a period of one hour, after which the mixture was kept at 95° C. for 30 minutes and then a mixture of 75.0 g of xylene and 1.50 g of AIBN was further added dropwise over a period of 30 minutes. Thereafter, the mixture was kept at 95° C. for 2 hours, then 225 g of xylene was added, followed by cooling. To the resultant reaction mixture, 22.5 g of 1,2,4-triazole was added and mixed well to produce a varnish composition. The number-average molecular weight of the obtained polymer was 11,500.

EXAMPLE 8

Into a four-necked flask equipped with a stirrer, a condenser, an $N_2$ gas feed pipe, a dropping funnel and a thermometer, 300 g of xylene and 146 g of maleic anhydride were supplied and stirred at 95° C. Then a mixture of 70.8 of n-butyl methacrylate, 383 g of n-butyl acrylate and 2.00 g of AIBN was added dropwise with stirring into the flask in an N₂ gas stream over a period of 4 hours. After the dropwise addition was completed, the mixture was further stirred at 95° C. for one hour. Then a mixture of 60.0 g of xylene and 1.20 g of AIBN was added dropwise over a period of one hour, after which the mixture was kept at 95° C. for 30 minutes and then a mixture of 60.0 g of xylene and 1.20 g of AIBN was added dropwise over a period of 30 minutes. Thereafter, the mixture was kept at 95° C. for 2 hours, followed by addition of 180 g of xylene and cooling. To the resultant reaction mixture, 18 g of 1,2,4-triazole was added and mixed well to produce a varnish composition. The number-average molecular weight of the obtained polymer was 11,700.

EXAMPLE 9

Into a four-necked flask equipped with a stirrer, a condenser, an N₂ gas feed pipe, a dropping funnel and a thermometer, 250 g of xylene and 77.7 g of maleic anhydride were supplied and stirred at 95° C. Then a mixture of 169 g of n-butyl methacrylate, 253 g of n-butyl acrylate and 1.67 g of AIBN was added dropwise with stirring into the flask in an N₂ gas stream over a period of 3 hours. After the dropwise addition was completed, the mixture was further stirred at 95° C. for one hour. Then a mixture of 50.0 g of xylene and 1.00 g of AIBN was added dropwise over a period of one hour, after which the mixture was kept at 95° C. for 30 minutes and then a mixture of 50.0 g of xylene and 1.00 g of AIBN was further added dropwise over a period of 30 minutes. Thereafter, the mixture was kept at 95° C. for 2 hours, followed by addition of 150 g of xylene and cooling. To the resultant reaction mixture, 15 g of 3-amino-1H-1,2,4-triazole was added and mixed well to produce a varnish composition. The number-average molecular weight of the obtained polymer was 16,300.

EXAMPLE 10

Into a four-necked flask equipped with a stirrer, a condenser, an N₂ gas feed pipe, a dropping funnel and a thermometer, 300 g of xylene and 95.2 g of maleic anhydride were supplied and stirred at 95° C. Then a mixture of 69.1 g of n-butyl methacrylate, 436 g of n-butyl acrylate and 6.00 g of AIBN was added dropwise with stirring into the flask in an N₂ gas stream over a period of 3 hours. After the dropwise addition was completed, the mixture was further stirred at 95° C. for one hour. Then a mixture of 60.0 g of xylene and 1.2 g of AIBN was added dropwise over a period of one hour, after which the mixture was kept at 95° C. for 30 minutes and then a mixture of 60.0 g of xylene and 1.2 g of AIBN was added dropwise over a period of 30 minutes. Thereafter, the mixture was kept at 95° C. for 2 hours, followed by addition of 180 g of xylene and cooling. To the resultant reaction mixture, 18 g of 3-amino-1H-1,2,4-triazole was added and mixed well to produce a varnish composition. The number-average molecular weight of the obtained polymer was 12,500.

EXAMPLE 11

Into a four-necked flask equipped with a stirrer, a condenser, an N₂ gas feed pipe, a dropping funnel and a thermometer, 375 g of xylene and 181 g of maleic anhydride were supplied and stirred at 95° C. Then a mixture of 175 g of n-butyl methacrylate, 394 g of n-butyl acrylate and 2.50 g of AIBN was added dropwise with stirring into the flask in an N₂ gas stream over a period of 4 hours. After the dropwise addition was completed, the mixture was further stirred at 95° C. for one hour. Then a mixture of 75.0 g of xylene and 1.50 g of AIBN was added dropwise over a period of one hour, after which the mixture was kept at 95° C. for 30 minutes and then a mixture of 75.0 g of xylene and 1.50 g of AIBN was further added dropwise over a period of 30 minutes. Thereafter, the mixture was kept at 95° C. for 2 hours, then 225 g of xylene was added, followed by cooling. To the resultant reaction mixture, 22.5 g of 3-amino-1H-1,2,4-triazole was added and mixed well to produce a varnish composition. The number-average molecular weight of the obtained polymer was 11,500.

EXAMPLE 12

Into a four-necked flask equipped with a stirrer, a condenser, an N₂ gas feed pipe, a dropping funnel and a thermometer, 300 g of xylene and 146 g of maleic anhydride were supplied and stirred at 95° C. Then a mixture of 70.8 g of n-burtyl methacrylate, 383 g of n-butyl acrylate and 2.00 g of AIBN was added dropwise with stirring into the flask in an N₂ gas stream over a period of 4 hours. After the dropwise addition was completed, the mixture was further stirred at 95° C. for one hour. Then a mixture of 60.0 g of xylene and 1.20 g of AIBN was added dropwise over a period of one hour, after which the mixture was kept at 95° C. for 30 minutes and then a mixture of 60.0 g of xylene and 1.20 g of AIBN was added dropwise over a period of 30 minutes. Thereafter, the mixture was kept at 95° C. for 2 hours, then 180 g of xylene was added, followed by cooling. To the resultant reaction mixture, 18 g of 3-amino-1H-1,2,4-triazole was added and mixed well to produce a varnish composition. The number-average molecular weight of the obtained polymer was 11,700.

EXAMPLE 13

Into a four-necked flask equipped with a stirrer, a condenser, an N₂ gas feed pipe, a dropping funnel and a thermometer, 250 g of xylene and 77.7 g of maleic anhydride were supplied and stirred at 95° C. Then a mixture of 169 g of n-butyl methacrylate, 253 g of n-butyl acrylate and 1.67 g of AIBN was added dropwise with stirring into the flask in an N₂ gas stream over a period of 3 hours. After the dropwise addition was completed, the mixture was further stirred at 95° C. for one hour. Then a mixture of 50.0 g of xylene and 1.00 g of AIBN was added dropwise over a period of one hour, after which the mixture was kept at 95° C. for 30 minutes and then a mixture of 50.0 g of xylene and 1.00 g of AIBN was further added dropwise over a period of 30 minutes. Thereafter, the mixture was kept at 95° C. for 2 hours, followed by addition of 150 g of xylene and cooling. To the resultant reaction mixture, 15 g of (2-benzothiazylthio)acetic acid was added and mixed well to produce a varnish composition. The number-average molecular weight of the obtained polymer was 16,300.

EXAMPLE 14

Into a four-necked flask equipped with a stirrer, a condenser, an N₂ gas feed pipe, a dropping funnel and a thermometer, 300 g of xylene and 95.2 g of maleic anhydride were supplied and stirred at 95° C. Then a mixture of 69.1 g of n-butyl methacrylate, 436 g of n-butyl acrylate and 6.00 g of AIBN was added dropwise with stirring into the flask in an N₂ gas stream over a period of 3 hours. After the dropwise addition was completed, the mixture was further stirred at 95° C. for one hour. Then a mixture of 60.0 g of xylene and 1.2 g of AIBN was added dropwise over a period of one hour, after which the mixture was kept at 95° C. for 30 minutes and then a mixture of 60.0 g of xylene and 1.2 g of AIBN was added dropwise over a period of 30 minutes. Thereafter, the mixture was kept at 95° C. for 2 hours, followed by addition of 180 g of xylene and cooling. To the resultant reaction mixture, 18 g of (2-benzothiazylthio)acetic acid was added and mixed well to produce a varnish composition. The number-average molecular weight of the obtained polymer was 12,500.

EXAMPLE 15

Into a four-necked flask equipped with a stirrer, a condenser, an $N_2$ gas feed pipe, a dropping funnel and a thermometer, 375 g of xylene and 181 g of maleic anhydride were supplied and stirred at 95° C. Then a mixture of 175 g of n-butyl methacrylate, 394 g of n-butyl acrylate and 2.50 g of AIBN was added dropwise with stirring into the flask in an $N_2$ gas stream over a period of 4 hours. After the dropwise addition was completed, the mixture was further stirred at 95° C. for one hour. Then a mixture of 75.0 g of xylene and 1.50 g of AIBN was added dropwise over a period of one hour, after which the mixture was kept at 95° C. for 30 minutes and then a mixture of 75.0 g of xylene and 1.50 g of AIBN was added dropwise over a period of 30 minutes. Thereafter, the mixture was kept at 95° C. for 2 hours, followed by addition of 225 of xylene and cooling. To the resultant reaction mixture, 22.5 g of (2-benzothiazythio)acetic acid was added and mixed well to produce a varnish composition. The number-average molecular weight of the obtained polymer was 11,500.

EXAMPLE 16

Into a four-necked flask equipped with a stirrer, a condenser, an $N_2$ gas feed pipe, a dropping funnel and a thermometer, 300 g of xylene and 146 g of maleic anhydride were supplied and stirred at 95° C. Then a mixture of 70.8 g of n-butyl methacrylate, 383 g of n-butyl acrylate and 2.00 g of AIBN was added dropwise with stirring into the flask in an $N_2$ gas stream over a period of 4 hours. After the dropwise addition was completed, the mixture was further stirred at 95° C. for one hour. Then a mixture of 60.0 g of xylene and 1.20 g of AIBN was added dropwise over a period of one hour, after which the mixture was kept at 95° C. for 30 minutes and then a mixture of 60.0 g of xylene and 1.20 g of AIBN was further added dropwise over a period of 30 minutes. Thereafter, the mixture was kept at 95° C. for 2 hours, then 180 g of xylene was added, followed by cooling. To the resultant reaction mixture, 18 g of (2-benzothiazylthio)acetic acid was added and mixed well to produce a varnish composition. The number-average molecular weight of the obtained polymer was 11,700.

EXAMPLE 17

Into a four-necked flask equipped with a stirrer, a condenser, an $N_2$ gas feed pipe, a dropping funnel and a thermometer, 250 g of xylene and 77.7 g of maleic anhydride were supplied and stirred at 95° C. Then a mixture of 169 g of n-butyl methacrylate, 253 g of n-butyl acrylate and 1.67 g of AIBN was added dropwise with stirring into the flask in an $N_2$ gas stream over a period of 3 hours. After the dropwise addition was completed, the mixture was further stirred at 95° C. for one hour. Then a mixture of 50.0 g of xylene and 1.00 g of AIBN was added dropwise over a period of one hour, after which the mixture was kept at 95° C. for 30 minutes and then a mixture of 50.0 g of xylene and 1.00 g of AIBN was further added dropwise over a period of 30 minutes. Thereafter, the mixture was kept at 95° C. for 2 hours, followed by addition of 150 g of xylene and cooling. To the resultant reaction mixture, 15 g of 2,5-dimercapto-1,3,4-thiadiazole was added and mixed well to produce a varnish composition. The number-average molecular weight of the obtained polymer was 16,300.

EXAMPLE 18

Into a four-necked flask equipped with a stirrer, a condenser, an $N_2$ gas feed pipe, a dropping funnel and a thermometer, 300 g of xylene and 95.2 g of maleic anhydride were supplied and stirred at 95° C. The a mixture of 69.1 g of n-butyl methacrylate, 436 g of n-butyl acrylate and 6.00 g of AIBN was added dropwise with stirring into the flask in an $N_2$ gas stream over a period of 3 hours. After the dropwise addition was completed, the mixture was further stirred at 95° C. for one hour. Then a mixture of 60.0 g of xylene and 1.2 g of AIBN was added dropwise over a period of one hour, after which the mixture was kept at 95° C. for 30 minutes and then a mixture of 60.0 g of xylene and 1.2 g of AIBN was further added dropwise over a period of 30 minutes. Thereafter, the mixture was kept at 95° C. for 2 hours, followed by addition of 180 g of xylene and cooling. To the resultant reaction mixture, 18 g of 2,5-dimercapto-1,3,4-thiadiazole was added and mixed well to produce a varnish composition. The number-average molecular weight of the obtained polymer was 12,500.

EXAMPLE 19

Into a four-necked flask equipped with a stirrer, a condenser, an $N_2$ gas feed pipe, a dropping funnel and a thermometer, 375 g of xylene and 181 g of maleic anhydride were supplied and stirred at 95° C. Then a mixture of 175 g of n-butyl methacrylate, 394 g of n-butyl acrylate and 2.50 g of AIBN was added dropwise with stirring into the flask in an $N_2$ gas stream over a period of 4 hours. After the dropwise addition was completed, the mixture was further stirred at 95° C. for one hour. Then a mixture of 75.0 g of xylene and 1.50 g of AIBN was added dropwise over a period of one hour, after which the mixture was kept at 95° C. for 30 minutes and then a mixture of 75.0 g of xylene and 1.50 g of AIBN was added dropwise over a period of 30 minutes. Thereafter, the mixture was kept at 95° C. for 2 hours, followed by addition of 225 g of xylene and cooling. To the resultant reaction mixture, 22.5 g of 2,5-dimercapto-1,3,4-thiadiazole was added and mixed well to produce a varnish composition. The number-average molecular weight of the obtained polymer was 11,500.

EXAMPLE 20

Into a four-necked flask equipped with a stirrer, a condenser, an $N_2$ gas feed pipe, a dropping funnel and a thermometer, 300 g of xylene and 146 g of maleic anhydride were supplied and stirred at 95° C. Then a mixture of 70.8 g of n-butyl methacrylate, 383 g of n-butyl acrylate and 2.00 g of AIBN was added dropwise with stirring into the flask in an $N_2$ gas stream over a period of 4 hours. After the dropwise addition was completed, the mixture was further stirred at 95° C. for one hour. Then a mixture of 60.0 g of xylene and 1.20 g of AIBN was added dropwise over a period of one hour, after which the mixture was kept at 95° C. for 30 minutes and then a mixture of 60.0 g of xylene and 1.20 g of AIBN was added dropwise over a period of 30 minutes. Thereafter, the mixture was kept at 95° C. for 2 hours, then 180 g of xylene was added, followed by cooling. To the resultant reaction mixture, 18 g of 2,5-dimercapto-1,3,4-thiadiazole was added and mixed well to produce a varnish composition. The number-average molecular weight of the obtained polymer was 11,700.

EXAMPLE 21

Into a four-necked flask equipped with a stirrer, a condenser, an $N_2$ gas feed pipe, a dropping funnel and a thermometer, 75.0 g of xylene and 22.55 g of maleic anhydride were supplied and stirred at 95° C. Then a mixture of 98.12 g of n-butyl methacrylate, 29.47 g of n-butyl acrylate and 1.50 g of AIBN was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and then a mixture of 15.0 g of xylene and 0.30 g of AIBN was added dropwise over a period of 30 minutes. Thereafter, the mixture was kept at 95° C. for 2 hours, then 45.0 g of xylene was added followed by cooling. To the resultant reaction mixture, 2.22 g of maleic anhydride and 4.5 g of 1,2,3-benzotriazole were added and mixed well to produce a varnish composition. The number-average molecular weight of the obtained polymer was 13,800.

EXAMPLE 22

Into a four-necked flask equipped with a stirrer, a condenser, an $N_2$ gas feed pipe, a dropping funnel and a thermometer, 75.0 g of xylene and 22.55 g of maleic anhydride were supplied and stirred at 95° C. Then a mixture of 98.12 g of n-bityl methacrylate, 29.47 g of n-butyl acrylate and 0.75 g of α-methylstyrene dimer was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and then a mixture of 15.0 g of xylene and 0.30 g of AIBN was added dropwise over a period of 30 minutes. Thereafter, the mixture was kept at 95° C. for 2 hours, then 45.0 g of xylene was added, followed by cooling. To the resultant reaction mixture, 2.58 g of methylmaleic anhydride and 4.5 g of 1,2,3-benzotriazole were added and mixed well to prepare a varnish composition. The number-average molecular weight of the obtained polymer was 13,800.

EXAMPLE 23

Into a four-necked flask equipped with a stirrer, a condenser, an $N_2$ gas feed pipe, a dropping funnel and a thermometer, 75.0 g of xylene and 22.55 g of maleic anhydride were supplied and stirred at 95° C. Then a mixture of 98.12 g of n-butyl methacrylate, 29.47 g of n-butyl acrylate, 1.50 g of AIBN and 0.75 g of α-methylstyrene dimer was added dropwise with stirring into the flask in an $N_2$ gas stream over a period of 4 hours. After the dropwise addition was completed, the mixture was kept at 95° C. for one hour. Then a mixture of 15.0 g of xylene and 0.30 g of AIBN was added dropwise over a period of one hour, after which the mixture was kept at 95° C. for 30 minutes and then a mixture of 15.0 g of xylene and 0.30 g of AIBN was further added dropwise over a period of 30 minutes. Thereafter, the mixture was kept at 95° C. for 2 hours, then 45.0 g of xylene was added, followed by cooling. To the resultant reaction mixture, 2.58 g of itaconic anhydride and 4.5 g of 1,2,3-benzotriazole were added and mixed well to prepare a varnish composition. The number-average molecular weight of the obtained polymer was 13,800.

EXAMPLE 24

Into a four-necked flask equipped with a stirrer, a condenser, an $N_2$ gas feed pipe, a dropping funnel and a thermometer, 75.0 g of xylene and 22.55 g of maleic anhydride were supplied and stirred at 95° C. Then a mixture of 98.12 g of n-butyl methacrylate, 29.47 g of n-butyl acrylate, 1.50 g of AIBN and 0.75 g of α-methylstyrene dimer was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and then a mixture of 15.0 g of xylene and 0.30 g of AIBN was further added dropwise over a period of 30 minutes. Thereafter, the mixture was kept at 95° C. for 2 hours, followed by addition of 45.0 g of xylene and cooling. To the resultant reaction mixture, 2.30 g of succinic anhydride and 4.5 g of 1,2,3-benzotriazole were added and mixed well to prepare a varnish composition. The number-average molecular weight of the obtained polymer was 13,800.

EXAMPLE 25

Into a four-necked flask equipped with a stirrer, a condenser, an $N_2$ gas feed pipe, a dropping funnel and a thermometer, 75.0 g of xylene and 22.55 g of maleic anhydride were supplied and stirred at 95° C. Then a mixture of 98.12 g of n-butyl methacrylate, 29.47 g of n-butyl acrylate, 1.50 g of AIBN and 0.75 g of α-methylstyrene dimer was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and then a mixture of 15.0 g of xylene and 0.30 g of AIBN was added dropwise over a period of 30 minutes. Thereafter, the mixture was kept at 95° C. for 2 hours, followed by addition of 45.0 g of xylene and cooling. To the resultant reaction mixture, 3.0 g of diethylene glycol dibenzoate and 4.5 g of 1,2,3-benzotriazole were added and mixed well to prepare a varnish composition. The number-average molecular weight of the obtained polymer was 13,800.

EXAMPLE 26

Into a four-necked flask equipped with a stirrer, a condenser, an $N_2$ gas feed pipe, a dropping funnel and a thermometer, 75.0 g of xylene and 22.55 g of maleic anhydride were supplied and stirred at 95° C. Then a mixture of 98.12 g of n-butyl methacrylate, 29.47 g of n-butyl acrylate, 1.50 g of AIBN and 0.75 g of α-methylstyrene dimer was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and then a mixture of 15.0 g of xylene and 0.30 g of AIBN was added dropwise over a period of 30 minutes. Thereafter, the mixture was kept at 95° C. for 2 hours, followed by addition of 45.0 g of xylene and cooling. To the resultant reaction mixture, 3.0 g of tripropylene glycol diacrylate and 4.5 g of 1,2,3-benzotriazole were added and mixed well to prepare a varnish composition. The number-average molecular weight of the obtained polymer was 13,800.

EXAMPLE 27

Into a four-necked flask equipped with a stirrer, a condenser, an $N_2$ gas feed pipe, a dropping funnel and a thermometer, 75.0 g of xylene and 22.55 g of maleic anhydride were supplied and stirred at 95° C. Then a mixture of 98.12 g of n-butyl methacrylate, 29.47 g of n-butyl acrylate, 1.50 g of AIBN and 0.75 g of α-methylstyrene dimer was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and a mixture of 15.0 g of xylene and 0.30 g of AIBN was further added dropwise over a period of 30 minutes. Thereafter, the mixture was kept at 95° C. for 2 hours, followed by addition of 45.0 g of xylene and cooling. To the resultant reaction mixture, 3.0 g of tripropylene glycol diacrylate and 4.5 g of 1,2,3-benzotriazole were added and mixed well to prepare a varnish composition. The number-average molecular weight of the obtained polymer was 13,800.

EXAMPLE 28

Into a four-necked flask equipped with a stirrer, a condenser, an $N_2$ gas feed pipe, a dropping funnel and a thermometer, 75.0 g of xylene and 22.55 g of maleic anhydride were supplied and stirred at 95° C. Then a mixture of 98.12 g of n-butyl methacrylate, 29.47 g of n-butyl acrylate, 1.50 g of AIBN and 0.75 g of α-methylstyrene dimer was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and a mixture of 15.0 g of xylene and 0.30 g of AIBN was added dropwise over a period of 30 minutes. Thereafter, the mixture was kept at 95° C. for 2 hours, followed by addition of 45.0 g of xylene and cooling. To the resultant reaction mixture, 3.0 g of 18-crown-6 and 4.5 g of 1,2,3-benzotriazole were added and mixed well to prepare a varnish composition. The number-average molecular weight of the obtained polymer was 13,800.

EXAMPLE 29

Into a four-necked flask equipped with a stirrer, a condenser, an $N_2$ gas feed pipe, a dropping funnel and a thermometer, 75.0 g of xylene and 15.10 g of maleic anhydride were supplied and stirred at 95° C. Then a mixture of 38.23 g of a monomer of formula (I) (Compound No. 9, $R=CH_3$), 19.74 g of n-butyl acrylate, 76.35 g of 2-ethylhexyl methacrylate and 0.6 g of AIBN was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of 30 minutes, after which the mixture was kept at 95° C. for 2 hours, followed by addition of 45.0 g of xylene and cooling. To the resultant reaction mixture, 4.5 g of 1,2,3-benzotriazole was added and mixed well to prepare a varnish composition. The number-average molecular weight of the obtained polymer was 7,100.

EXAMPLE 30

Into a four-necked flask equipped with a stirrer, a condenser, an $N_2$ gas feed pipe, a dropping funnel and a thermometer, 75.0 g of xylene and 23.24 g of maleic anhydride were supplied and stirred at 95° C. Then a mixture of 39.23 g of a monomer of formula (I) (Compound No. 9, $R=CH_3$), 10.12 g of n-butyl acrylate, 78.33 g of 2-ethylhexyl methacrylate and 0.6 g of AIBN was added dropwise with stirring into the flask in an $N_2$ gas stream over a period of 4 hours. After the dropwise addition was completed, the mixture was further stirred at 95° C. for one hour and a mixture of 15.0 g of xylene and 0.30 g of AIBN was added dropwise over a period of one hour, after which the mixture was kept at 95° C. for 30 minutes and then a mixture of 15.0 g of xylene and 0.3 g of AIBN was further added dropwise over a period of 30 minutes. Thereafter, the mixture was kept at 95° C. for 2 hours, followed by addition of 45.0 g of xylene and cooling. To the resultant reaction mixture, 4.5 g of 1,2,3-benzotriazole was added and mixed well to prepare a varnish composition. The number-average molecular weight of the obtained polymer was 7,100.

EXAMPLE 31

Into a four-necked flask equipped with a stirrer, a condenser, an $N_2$ gas feed pipe, a dropping funnel and a thermometer, 75.0 g of xylene and 15.10 g of maleic anhydride were supplied and stirred at 95° C. Then a mixture of 38.23 g of a monomer of formula (I) (Compound No. 9, $R=CH_3$), 19.74 g of n-butyl acrylate, 76.35 g of 2-ethylhexyl methacrylate and 0.6 g of AIBN was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and then a mixture of 15.0 g of xylene and 0.3 g of AIBN was added dropwise over a period of 30 minutes. Thereafter, the mixture was kept at 95° C. for 2 hours, followed by addition of 45.0 g of xylene and cooling. To the resultant reaction mixture, 4.5 g of 1,2,4-triazole was added and mixed well to prepare a varnish composition. The number-average molecular weight of the obtained polymer was 7,100.

EXAMPLE 32

Into a four-necked flask equipped with a stirrer, a condenser, an $N_2$ gas feed pipe, a dropping funnel and a thermometer, 75.0 g of xylene and 23.24 g of maleic anhydride were supplied and stirred at 95° C. Then a mixture of 39.23 g of a monomer of formula (I) (Compound No. 9, $R=CH_3$), 10.12 g of n-butyl acrylate, 78.33 g of n-ethylhexyl methacrylate and 0.6 g of AIBN was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and then a mixture of 15.0 g of xylene and 0.3 g of AIBN was added dropwise over a period of 30 minutes. Thereafter, the mixture was kept at 95° C. for 2 hours, followed by addition of 45.0 g of xylene and cooling. To the resultant reaction mixture, 4.5 g of 1,2,4-triazole was added and mixed well to prepare a varnish composition. The number-average molecular weight of the obtained polymer was 7,100.

EXAMPLE 33

Into a four-necked flask equipped with a stirrer, a condenser, an $N_2$ gas feed pipe, a dropping funnel and a thermometer, 75.0 g of xylene and 15.10 g of maleic anhydride were supplied and stirred at 95° C. Then a mixture of 38.23 g of a monomer of formula (I) (Compound No. 9, $R=CH_3$), 19.74 g of n-butyl acrylate, 76.35 g of 2-ethylhexyl methacrylate and 0.6 g of AIBN was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and then a mixture of 15.0 g of xylene and 0.3 g of AIBN was further added dropwise over a period of 30 minutes. Thereafter, the mixture was kept at 95° C. for 2 hours, followed by addition of 45.0 g of xylene and cooling. To the resultant reaction mixture, 4.5 g of 3-amino-1H-1,2,4-tiazole was added and mixed well to prepare a varnish composition. The number-average molecular weight of the obtained polymer was 7,100.

EXAMPLE 34

Into a four-necked flask equipped with a stirrer, a condenser, an $N_2$ gas feed pipe, a dropping funnel and a thermometer, 75.0 g of xylene and 23.34 g of maleic anhydride were supplied and stirred at 95° C. Then a mixture of 39.23 g of a monomer of formula (I) (Compound No. 9, $R=CH_3$), 10.12 g of n-butyl acrylate, 78.33 g of 2-ethylhexyl methacrylate and 0.6 g of AIBN was added dropwise with stirring into the flask in an $N_2$ gas stream over a period of 4 hours. After the dropwise addition was completed, the mixture was further stirred at 95° C. for one hour and then a mixture of 15.0 g of xylene and 0.30 g of AIBN was added dropwise over a period of one hour, after which the mixture was kept at 95° C. for 30 minutes and a mixture of 15.0 g of xylene and 0.3 g of AIBN was added dropwise over a period of 30 minutes. Thereafter, the mixture was kept at 95° C. for 2 hours, followed by addition of 45.0 g of xylene and cooling. To the resultant reaction mixture, 4.5 g of 3-amino-1H-1,2,4-triazole was added and mixed well to prepare a varnish composition. The number-average molecular weight of the obtained polymer was 7,100.

EXAMPLE 35

Into a four-necked flask equipped with a stirrer, a condenser, an $N_2$ gas feed pipe, a dropping funnel and a thermometer, 75.0 g of xylene and 35.3 g of maleic anhydride were supplied and stirred at 95° C. Then a mixture of 22.6 g of a monomer of formula (I) (Compound No. 2, $R=CH_3$), 92.2 g of n-butyl acrylate and 1.5 g of AIBN was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and a mixture of 15.0 g of xylene and 0.3 g of AIBN was further added dropwise over a period of 30 minutes. Thereafter, the mixture was kept at 95° C. for 2 hours, followed by addition of 45.0 g of xylene and cooling. To the resultant reaction mixture, 4.5 g of 1,2,3-benzotriazole was added and mixed well to prepare a varnish composition (A). The number-average molecular weight of the obtained polymer was 6,300.

Further, into a four-necked flask equipped with a stirrer, a condenser, an $N_2$ gas feed pipe, a dropping funnel and a thermometer, 75.0 g of xylene and 21.25 g of maleic anhydride were supplied and stirred at 95° C. Then a mixture of 128.75 g of 2-ethylhexyl methacrylate and 0.5 g of AIBN was added dropwise with stirring into the flask in an $N_2$ gas stream over a period of 4 hours. After the dropwise addition was completed, the mixture was further stirred at 95° C. for one hour and then a mixture of 15.0 g of xylene and 0.30 g of AIBN was added dropwise over a period of one hour, after which the mixture was kept at 95° C. for 30 minutes and a mixture of 15.0 g of xylene and 0.3 g of AIBN was further added dropwise over a period of 30 minutes. Thereafter, the mixture was kept at 95° C. for 2 hours, followed by addition of 45.0 g of xylene and cooling. To the resultant reaction mixture, 4.5 g of 1,2,3-benzotriazole was added and mixed well to prepare a varnish composition (B). The number-average molecular weight of the obtained polymer was 7,300. 80 g of varnish composition (A) and 20 g of varnish composition (B) were mixed well to prepare a mixed varnish composition.

EXAMPLE 36

60 g of varnish composition (A) and 40 g of varnish composition ( B ) obtained in the above Example 35 were mixed well to prepare a mixed varnish composition.

EXAMPLE 37

Into a four-necked flask equipped with a stirrer, a condenser, an $N_2$ gas feed pipe, a dropping funnel and a thermometer, 75.0 g of xylene and 35.3 g of maleic anhydride were supplied and stirred at 95° C. Then a mixture of 22.6 g of a monomer of formula (I) (Compound No. 2, $R=CH_3$), 92.2 g of n-butyl acrylate and 1.5 g of AIBN was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and a mixture of 15.0 g of xylene and 0.3 g of AIBN was further added dropwise over a period of 30 minutes. Thereafter, the mixture was kept at 95° C. for 2 hours, followed by addition of 45.0 g of xylene and cooling. To the resultant reaction mixture, 4.5 g of 1,2,4-triazole was added and mixed well to prepare a varnish composition (C). The number-average molecular weight of the obtained polymer was 6,300.

Further, into a four-necked flask equipped with a stirrer, a condenser, an $N_2$ gas feed pipe, a dropping funnel and a thermometer, 75.0 g of xylene and 21.25 g of maleic anhydride were supplied and stirred at 95° C. Then a mixture of 128.75 g of 2-ethylhexyl methacrylate and 0.5 g of AIBN was added dropwise with stirring into the flask in an $N_2$ gas stream over a period of 4 hours. After the dropwise addition was completed, the mixture was further stirred at 95° C. for one hour and then a mixture of 15.0 g of xylene and 0.30 g of AIBN was added dropwise over a period of 30 minutes, after which the mixture was kept at 95° C. for 30 minutes and a mixture of 15.0 g of xylene and 0.3 g of AIBN was further added dropwise over a period of 30 minutes. Thereafter, the mixture was kept at 95° C. for 2 hours, followed by addition of 45.0 g of xylene and cooling. To the resultant reaction mixture, 4.5 g of 1,2,4-triazole was added and mixed well to prepare a varnish composition (D). The number-average molecular weight of the obtained polymer was 7,300. 80 g of varnish composition (C) and 20 g of varnish composition (D) were mixed well to prepare a mixed varnish composition.

EXAMPLE 38

60 g of varnish composition (C) and 40 g of varnish composition (D) obtained in the above Example 37 were mixed well to prepare a mixed varnish composition.

EXAMPLE 39

Into a four-necked flask equipped with a stirrer, a condenser, an $N_2$ gas feed pipe, a dropping funnel and a thermometer, 75.0 g of xylene and 35.3 g of maleic anhydride were supplied and stirred at 95° C. Then a mixture of 22.6 g of a monomer of formula (I) (Compound No. 2, $R=CH_3$), 92.2 g of n-butyl acrylate and 1.5 g of AIBN was added dropwise with stirring into the flask in an $N_2$ gas stream over a period of 4 hours. After the dropwise addition was completed, the mixture was further stirred at 95° C. for one hour and then a mixture of 15.0 g of xylene and 0.30 g of AIBN was added dropwise over a period of one hour. The mixture was kept at 95° C. for 30 minutes and then a mixture of 15.0 g of xylene and 0.3 g of AIBN was further added dropwise over a period of 30 minutes. Thereafter, the mixture was kept at 95° C. for 2 hours, followed by addition of 45.0 g of xylene and cooling. To the resultant reaction mixture, 4.5 g of 3-amino-1H-1,2,4-triazole was added and mixed well to prepare a varnish composition (E). The number-average molecular weight of the obtained polymer was 6,300.

Further, into a four-necked flask equipped with a stirrer, a condenser, an $N_2$ gas feed pipe, a dropping funnel and a thermometer, 75.0 g of xylene and 21.25 g of maleic anhydride were supplied and stirred at 95° C. Then a mixture of 128.75 g of 2-ethylhexyl methacrylate and 0.5 g of AIBN was added dropwise with stirring into the flask in an $N_2$ gas stream over a period of 4 hours. After the dropwise addition was completed, the mixture was further stirred at 95° C. for one hour and a mixture of 15.0 g of xylene and 0.30 g of AIBN was added dropwise over a period of one hour, after which the mixture was kept at 95° C. for 30 minutes and a mixture of 15.0 g of xylene and 0.3 g of AIBN was further added dropwise over a period of 30 minutes. Thereafter, the mixture was kept at 95° C. for 2 hours, followed by addition of 45.0 g of xylene and cooling. To the resultant reaction mixture, 4.5 g of 3-amino-1H-1,2,4-triazole was added and mixed well to prepare a varnish composition (F). The number-average molecular weight of the obtained polymer was 7,300. 80 g of varnish composition (E) and 20 g of varnish composition (F) were mixed well to prepare a mixed varnish composition.

EXAMPLE 40

60 g of varnish composition (E) and 40 g of varnish composition (F) obtained in the above Example 39 were mixed well to prepare a mixed varnish composition.

Preparation Example 1

Into a four-necked flask equipped with a stirrer, a condenser, an $N_2$ gas feed pipe, a dropping funnel and a thermometer, 75.0 g of xylene and 16.89 g of maleic anhydride were supplied and stirred at 95° C. Then a mixture of 81.62 g of n-butyl methacrylate, 51.5 g of n-butyl acrylate and 0.375 g of AIBN was added dropwise with stirring into the flask in an $N_2$ gas stream over a period of 3 hours. After the dropwise addition was completed, the mixture was further stirred at 95° C. for one hour and a mixture of 15.0 g of xylene and 0.30 g of AIBN was added dropwise over a period of one hour, after which the mixture was kept at 95° C. for 30 minutes and a mixture of 15.0 g of xylene and 0.3 g of AIBN was further added dropwise over a period of 30 minutes. Thereafter, the mixture was kept at 95° C. for 2 hours, followed by addition of 45.0 g of xylene and cooling to produce a varnish. The number-average molecular weight of the obtained polymer was 32,000.

Preparation Example 2

Into a four-necked flask equipped with a stirrer, a condenser, an $N_2$ gas feed pipe, a dropping funnel and a thermometer, 75.0 g of xylene and 16.89 g of maleic anhydride were supplied and stirred at 95° C. Then a mixture of 81.62 g of n-butyl methacrylate, 51.5 g of n-butyl acrylate and 0.375 g of AIBN was added dropwise with stirring into the flask in an $N_2$ gas stream over a period of 3 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and a mixture of 15.0 g of xylene and 0.3 g of AIBN was further added dropwise over a period of 30 minutes. Thereafter, the mixture was kept at 95° C. for 2 hours, then 45.0 g of xylene was added and the mixture was cooled to produce a varnish. The number-average molecular weight of the obtained polymer was 12,700.

Preparation Example 3

Into a four-necked flask equipped with a stirrer, a condenser, an $N_2$ gas feed pipe, a dropping funnel and a thermometer, 75.0 g of xylene and 22.55 g of maleic anhydride were supplied and stirred at 95° C. Then a mixture of 98.12 g of n-butyl methacrylate, 29.47 g of n-butyl acrylate, 1.50 g of AIBN and 0.75 g of α-methylstyrene dimer was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and then a mixture of 15.0 g of xylene and 0.30 g of AIBN was further added dropwise over a period of 30 minutes. Thereafter, the mixture was kept at 95° C. for 2 hours, followed by addition of 45.0 g of xylene and cooling to produce a varnish. The number-average molecular weight of the obtained polymer was 13,800.

Preparation Example 4

Into a four-necked flask equipped with a stirrer, a condenser, an $N_2$ gas feed pipe, a dropping funnel and a thermometer, 75.0 g of xylene and 22.75 g of maleic anhydride were supplied and stirred at 95° C. Then a mixture of 82.48 g of n-butyl methacrylate, 44.60 g of n-butyl acrylate, 1.50 g of AIBN and 0.75 g of α-methylstyrene dimer was added dropwise with stirring into the flask in an $N_2$ gas stream over a period of 4 hours. After the dropwise addition was completed, the mixture was further stirred at 95° C. for one hour. Then a mixture of 15.0 g of xylene and 0.30 g of AIBN was added dropwise over a period of one hour, after which the mixture was kept at 95° C. for 30 minutes and a mixture of 15.0 g of xylene and 0.30 g of AIBN was further added dropwise over a period of 30 minutes. Thereafter, the mixture was kept at 95° C. for 2 hours, then 45.0 g of xylene was added and the mixture was cooled to produce a varnish. The number-average molecular weight of the obtained polymer was 15,100.

Preparation Example 5

According to the method described in WO 84/02915, 114.6 g of 2,2,2-trifluoroethyl methacrylate, 14.6 g of methyl methacrylate, 20.8 g of butyl acrylate and 150 g of xylene were supplied into a 500 ml flask equipped with a thermometer and a stirrer, followed by addition of 1.5 g of AIBN as polymerization a catalyst, heating at 80° C. for one hour, 6-hour polymerization at 80° C. and cooling to produce a varnish. The number-average molecular weight of the obtained polymer was 11,000.

Preparation Example 6

According to the method described in WO 84/02915, 118.2 g of p-nitrophenyl acrylate, 13.1 g of methyl methacrylate, 18.6 g of butyl acrylate and 150 g of xylene were supplied into a 500 ml flask equipped with a thermometer and a stirrer, followed by addition of 1.5 g of AIBN as polymerization catalyst, heating at 80° C. for one hour, 6-hour polymerization at 80° C. and cooling to produce a varnish. The number-average molecular weight of the obtained polymer was 12,300.

Preparation Example 7

According to the method described in JP-A-58-180565, first 80 g of xylene was supplied into a 300 ml flask equipped with a thermometer and a stirrer. Then xylene was heated to 100° C. while blowing nitrogen thereinto, and a mixture of 100 g of methoxydiethylene glycol methacrylate and 1.3 g of tertiary butyl peroxy(2-ethylhexate) was added dropwise over a period of 2 hours. After the dropwise addition was completed, the mixture was stirred at the same temperature for 2 hours, followed by addition of a mixed solution consisting of 0.2 g of tertiary butyl peroxy(2-ethylhexate) and 10 g of xylene, and the mixture was further stirred for one hour. Then the mixture was heated to 120° C. and kept at the same temperature for one hour. After the polymerization reaction was completed, 10 g of xylene was added and then the reaction mixture was cooled to obtain a varnish (G). In a separate operation, 80 g of xylene was supplied into a four-necked flask equipped with a thermometer and a stirrer, followed by heating to 100° C. while blowing nitrogen thereinto. Then a mixed solution consisting of 100 g of methyl methacrylate and 1.3 g of tertiary butyl peroxy(2-ethylhexate) was added dropwise with stirring over a period of 2 hours. After the dropwise addition was completed, the mixture was stirred at the same temperature for 2 hours, then a mixed solution consisting of 0.2 g of tertiary butyl peroxy(2-ethylhexate) and 10 g of xylene was added and the mixture was further stirred for one hour. Then the mixture was heated to 120° C. and kept at the same temperature for one hour. After the polymerization reaction was completed, 10 g of xylene was added and then the reaction mixture was cooled to obtain a varnish (H). 20 g of varnish (G) and 80 g of varnish (H) were melted and mixed together at 100° C. to prepare a mixed varnish.

Preparation Example 8

According to the method described in JP-A-57-92061, 240 g of tri-n-butyltin methacrylate, 140 g of methyl methacrylate, 15 g of octyl acrylate, 5 g of butyl acrylate and 400 g of xylene were supplied into a 1-liter flask equipped with a thermometer and a stirrer. Then 2 g of benzoyl peroxide was added as polymerization catalyst and the mixture was polymerized at 100°–105° C. for 4 hours and then at 120°–125° C. for one hour to obtain a high-molecular triorganotin compound-containing varnish. 12 g of 1,2,3-benzotriazole was added to this varnish and mixed well to produce a high-molecular triorganotin compound-containing varnish composition.

EXAMPLES 41–80

To the varnish compositions produced in the above Examples 1–40, cuprous oxide (powder; purity: over 90%) was added in an amount of 75 g per 25 g of resin solids of the varnish composition, and the mixtures were stirred and mixed up by a homogenizer to prepare the coating compositions.

Comparative Examples 1–8

To the varnishes or varnish compositions produced in the above Preparation Examples 1–8, cuprous oxide (powder; purity: over 90%) was added in an amount of 75 g per 25 g of resin solids of the varnish or varnish composition, and the mixtures were stirred and mixed up by a homogenizer to prepare the coating compositions.

Evaluation Test Example 1

Each of the coating compositions produced in the above Examples 41–80 and Comparative Examples 1–4 and 8 was left at room temperature overnight after preparation, then the condition of the coating composition was observed and viscosity was measured at 25° C. These coating compositions were each placed in a sample bottle and the bottle, after stoppered, was kept in a 40° C. thermostat for 20 days. After storage, the condition of each coating composition was observed and viscosity was measured at 25° C. The results are shown in Tables 1–5. As is apparent from Tables 1–4, the coating compositions (Examples 41–80) prepared by using the varnish compositions obtained from Examples 1–40 were not much thickened even when mixed with cuprous oxide and showed a remarkable thickening depressing effect.

TABLE 1

| Coating composition (Example No.) | Varnish composition (Example No.) | Change of viscosity with time (pa.s) 0 day | 20 days |
|---|---|---|---|
| 41 | 1 | 4.4 | 6.2 |
| 42 | 2 | 4.6 | 7.0 |
| 43 | 3 | 4.7 | 7.1 |
| 44 | 4 | 4.1 | 7.7 |
| 45 | 5 | 7.0 | 8.8 |
| 46 | 6 | 5.4 | 7.2 |
| 47 | 7 | 7.3 | 9.4 |
| 48 | 8 | 7.1 | 9.6 |
| 49 | 9 | 7.4 | 8.8 |
| 50 | 10 | 4.7 | 6.3 |

TABLE 2

| Coating composition (Example No.) | Varnish composition (Example No.) | Change of viscosity with time (pa.s) 0 day | 20 days |
|---|---|---|---|
| 51 | 11 | 7.3 | 8.6 |
| 52 | 12 | 6.7 | 8.5 |
| 53 | 13 | 9.1 | 12.5 |
| 54 | 14 | 5.7 | 8.8 |
| 55 | 15 | 8.5 | 11.6 |
| 56 | 16 | 7.7 | 11.1 |
| 57 | 17 | 6.7 | 8.4 |
| 58 | 18 | 4.6 | 6.1 |
| 59 | 19 | 7.8 | 9.2 |
| 60 | 20 | 6.5 | 8.2 |

TABLE 3

| Coating composition (Example No.) | Varnish composition (Example No.) | Change of viscosity with time (pa.s) 0 day | 20 days |
|---|---|---|---|
| 61 | 21 | 3.6 | 4.8 |
| 62 | 22 | 3.8 | 4.9 |
| 63 | 23 | 3.4 | 4.4 |
| 64 | 24 | 3.4 | 4.6 |
| 65 | 25 | 3.2 | 4.8 |
| 66 | 26 | 3.8 | 4.7 |
| 67 | 27 | 3.1 | 4.0 |
| 68 | 28 | 4.0 | 4.2 |
| 69 | 29 | 3.2 | 4.4 |
| 70 | 30 | 3.5 | 4.7 |

TABLE 4

| Coating composition (Example No.) | Varnish composition (Example No.) | Change of viscosity with time (pa.s) 0 day | 20 days |
|---|---|---|---|
| 71 | 31 | 3.6 | 4.5 |
| 72 | 32 | 3.8 | 4.2 |
| 73 | 33 | 3.1 | 4.2 |
| 74 | 34 | 3.3 | 4.3 |
| 75 | 35 | 3.3 | 4.6 |
| 76 | 36 | 3.8 | 4.8 |
| 77 | 37 | 3.2 | 4.4 |
| 78 | 38 | 3.6 | 4.8 |
| 79 | 39 | 3.0 | 4.2 |
| 80 | 40 | 3.2 | 4.7 |

TABLE 5

| Coating composition (Comp. Example No.) | Varnish or varnish composition (Preparation Example No.) | Change of viscosity with time (pa.s) 0 day | 20 days |
|---|---|---|---|
| 1 | 1 | 3.8 | 12.6 |
| 2 | 2 | 4.1 | 26.2 |
| 3 | 3 | 4.3 | 15.8 |
| 4 | 4 | 3.5 | 30.7 |
| 8 | 8 | 3.0 | 12.4 |

On the other hand, as is seen from Table 5, the coating compositions prepared by using the varnishes not containing the additive (B) obtained in Preparation Examples 1–4 were excessively thickened. It was also found that the coating composition of Comparative Example 8 disclosed in JP-A-57-92061 was thickened to a greater extent than the coating compositions of the present invention.

Evaluation Test Example 2

The coating formed from a coating composition prepared by using a coating varnish composition produced according to the present invention has the peculiar property that, when placed under a weakly alkaline condition, it is gradually hydrolyzed to become soluble in water and eluted. This fact is confirmed by the following experiment.

Each of the coating compositions prepared in Examples 41–80 and Comparative Examples 5 and 6 was coated on a 150 mm × 100 mm polypropylene plate to a dry coating thickness of 50 μm. The coated polypropylene plate was heated at 80° C. for 3 hours to remove the solvent in the coating and the initial weight of the plate was measured. Then the coated polypropylene plate was immersed in 1,750 cm³ of an alkaline buffer solution with a pH of 10.2. After left in said buffer solution at 45° C. for 24 hours, the polypropylene plate was taken out, washed with water and dried, followed by measurement of the final weight of the plate. The hydrolytic property of the coat was determined in terms of the amount of coat eluted from the difference between the initial weight and the final weight of the plate. The results are shown in Tables 6–10.

TABLE 6

| Coating composition (Example No.) | Varnish composition (Example No.) | Amount of coating eluted (mg/100 cm²) |
|---|---|---|
| 41 | 1 | Entirely eluted |
| 42 | 2 | " |
| 43 | 3 | " |
| 44 | 4 | " |
| 45 | 5 | " |
| 46 | 6 | " |
| 47 | 7 | " |
| 48 | 8 | " |
| 49 | 9 | " |
| 50 | 10 | " |

TABLE 7

| Coating composition (Example No.) | Varnish composition (Example No.) | Amount of coating eluted (mg/100 cm²) |
|---|---|---|
| 51 | 11 | Entirely eluted |
| 52 | 12 | " |
| 53 | 13 | " |
| 54 | 14 | " |
| 55 | 15 | " |
| 56 | 16 | " |
| 57 | 17 | " |
| 58 | 18 | " |
| 59 | 19 | " |

TABLE 7-continued

| Coating composition (Example No.) | Varnish composition (Example No.) | Amount of coating eluted (mg/100 cm²) |
|---|---|---|
| 60 | 20 | " |

TABLE 8

| Coating composition (Example No.) | Varnish composition (Example No.) | Amount of coating eluted (mg/100 cm²) |
|---|---|---|
| 61 | 21 | Entirely eluted |
| 62 | 22 | " |
| 63 | 23 | " |
| 64 | 24 | " |
| 65 | 25 | " |
| 66 | 26 | " |
| 67 | 27 | " |
| 68 | 28 | " |
| 69 | 29 | " |
| 70 | 30 | " |

TABLE 9

| Coating composition (Example No.) | Varnish composition (Example No.) | Amount of coating eluted (mg/100 cm²) |
|---|---|---|
| 71 | 31 | Entirely eluted |
| 72 | 32 | " |
| 73 | 33 | " |
| 74 | 34 | " |
| 75 | 35 | " |
| 76 | 36 | " |
| 77 | 37 | " |
| 78 | 38 | " |
| 79 | 39 | " |
| 80 | 40 | " |

TABLE 10

| Coating composition (Comp. Example No.) | Varnish composition (Preparation Example No.) | Amount of coating eluted (mg/100 cm²) |
|---|---|---|
| 5 | 5 | 3.2 |
| 6 | 6 | 4.1 |

As is apparent from Tables 6–9, the coating compositions prepared by using the varnish compositions obtained in Examples 1–40 of the present invention have a good hydrolytic property. It was thus found that these compositions are quite suited for use as a hydrolyzing type antifouling paint.

On the other hand, as is seen from Table 10, it was found that the coating compositions obtained in Comparative Examples 5 and 6, prepared by using the varnishes disclosed in WO 84/02915, are low in hydrolyzability.

Evaluation Test Example 3

The coating compositions produced in Examples 41–80 and Comparative Example 8 described above were left at room temperature overnight after preparation, and the condition of the compositions was observed. The composition which maintained a very smooth and good condition was marked with a circle (○) and the composition which had a custard-like condition or an unsmooth condition with insolubles left in the composition was marked with a cross (x).

Also, a coating was formed on an FRP plate by using each of said coating compositions and the coating was air-dried overnight at room temperature. Then the condition of the coating was observed. A coating with a very smooth surface was marked with ○ and a coating presenting an unsmooth surface with graininess was marked with x. The results are shown in Tables 11–15.

TABLE 11

| Coating composition (Example No.) | Varnish composition (Example No.) | Condition of paint | Condition of coating |
|---|---|---|---|
| 41 | 1 | ○ | ○ |
| 42 | 2 | ○ | ○ |
| 43 | 3 | ○ | ○ |
| 44 | 4 | ○ | ○ |
| 45 | 5 | ○ | ○ |
| 46 | 6 | ○ | ○ |
| 47 | 7 | ○ | ○ |
| 48 | 8 | ○ | ○ |
| 49 | 9 | ○ | ○ |
| 50 | 10 | ○ | ○ |

TABLE 12

| Coating composition (Example No.) | Varnish composition (Example No.) | Condition of paint | Condition of coating |
|---|---|---|---|
| 51 | 11 | ○ | ○ |
| 52 | 12 | ○ | ○ |
| 53 | 13 | ○ | ○ |
| 54 | 14 | ○ | ○ |
| 55 | 15 | ○ | ○ |
| 56 | 16 | ○ | ○ |
| 57 | 17 | ○ | ○ |
| 58 | 18 | ○ | ○ |
| 59 | 19 | ○ | ○ |
| 60 | 20 | ○ | ○ |

TABLE 13

| Coating composition (Example No.) | Varnish composition (Example No.) | Condition of paint | Condition of coating |
|---|---|---|---|
| 61 | 21 | ○ | ○ |
| 62 | 22 | ○ | ○ |
| 63 | 23 | ○ | ○ |
| 64 | 24 | ○ | ○ |
| 65 | 25 | ○ | ○ |
| 66 | 26 | ○ | ○ |
| 67 | 27 | ○ | ○ |
| 68 | 28 | ○ | ○ |
| 69 | 29 | ○ | ○ |
| 70 | 30 | ○ | ○ |

TABLE 14

| Coating composition (Example No.) | Varnish composition (Example No.) | Condition of paint | Condition of coating |
|---|---|---|---|
| 71 | 31 | ○ | ○ |
| 72 | 32 | ○ | ○ |
| 73 | 33 | ○ | ○ |
| 74 | 34 | ○ | ○ |
| 75 | 35 | ○ | ○ |
| 76 | 36 | ○ | ○ |
| 77 | 7 | ○ | ○ |
| 78 | 8 | ○ | ○ |
| 79 | 39 | ○ | ○ |
| 80 | 40 | ○ | ○ |

TABLE 15

| Coating composition (Comp. Example No.) | Varnish composition (Preparation Example No.) | Condition of paint | Condition of coating |
|---|---|---|---|
| 8 | 8 | x | x |

As is apparent from Tables 11–14, the coating compositions of the present invention (Examples 41–80) gave the paints with high smoothness and were capable of forming a coating having a very smooth surface.

On the other hand, as is seen from Table 15, the coating composition of Comparative Example 8, disclosed in JP-A-57-92061, had insolubles left therein and couldn't give a smooth coating material. Also, the coating formed therefrom was grainy on the surface and very bad in surface smoothness.

Evaluation Test Example 4

Each of the coating compositions produced in Examples 41–80 and Comparative Examples 1–6 and 8 described above was left at room temperature overnight after preparation, and then a coating was formed therewith on an FRP plate and air dried overnight at room temperature. The coated FRP plate was attached to a disc rotor and kept rotated at a constant speed (peripheral speed: approx. 15 knots) for 2 months in the seawater (water temperature: 15°±2° C.). Then the coating surface was observed and the change of coating thickness was measured. The results are shown in Tables 16–20.

TABLE 16

| Coating composition (Example No.) | Varnish composition (Example No.) | Coating thickness worn out (μm/month) | Consuming of coating |
|---|---|---|---|
| 41 | 1 | 9 | Uniform |
| 42 | 2 | 8 | " |
| 43 | 3 | 9 | " |
| 44 | 4 | 7 | " |
| 45 | 5 | 8 | " |
| 46 | 6 | 8 | " |
| 47 | 7 | 7 | " |
| 48 | 8 | 10 | " |
| 49 | 9 | 9 | " |
| 50 | 10 | 8 | " |

TABLE 17

| Coating composition (Example No.) | Varnish composition (Example No.) | Coating thickness worn out (μm/month) | Consuming of coating |
|---|---|---|---|
| 51 | 11 | 10 | Uniform |
| 52 | 12 | 9 | " |
| 53 | 13 | 8 | " |
| 54 | 14 | 8 | " |
| 55 | 15 | 7 | " |
| 56 | 16 | 9 | " |
| 57 | 17 | 11 | " |
| 58 | 18 | 9 | " |
| 59 | 19 | 8 | " |
| 60 | 20 | 9 | " |

TABLE 18

| Coating composition (Example No.) | Varnish composition (Example No.) | Coating thickness worn out (μm/month) | Consuming of coating |
|---|---|---|---|
| 61 | 21 | 7 | Uniform |
| 62 | 22 | 8 | " |
| 63 | 23 | 9 | " |
| 64 | 24 | 9 | " |
| 65 | 25 | 10 | " |
| 66 | 26 | 8 | " |
| 67 | 27 | 7 | " |
| 68 | 28 | 8 | " |
| 69 | 29 | 17 | " |
| 70 | 30 | 15 | " |

TABLE 19

| Coating composition (Example No.) | Varnish composition (Example No.) | Coating thickness worn out (μm/month) | Consuming of coating |
|---|---|---|---|
| 71 | 31 | 16 | Uniform |
| 72 | 32 | 14 | " |
| 73 | 33 | 18 | " |
| 74 | 34 | 13 | " |
| 75 | 35 | 15 | " |
| 76 | 36 | 13 | " |
| 77 | 37 | 18 | " |
| 78 | 38 | 15 | " |
| 79 | 39 | 16 | " |
| 80 | 40 | 14 | " |

TABLE 20

| Coating composition (Comp. Example No.) | Varnish or varnish composition (Preparation Example No.) | Coating thickness worn out (μm/month) | Consuming of coating |
|---|---|---|---|
| 1 | 1 | 1 | Uniform |
| 2 | 2 | 0 | " |
| 3 | 3 | 0 | " |
| 4 | 4 | 1 | " |
| 5 | 5 | 1 | " |
| 6 | 6 | 1 | " |
| 8 | 8 | 4~11 | Nonuniform |

As is seen from Tables 16–19, in the case of the coating compositions of the present invention (Examples 41–80), consuming of the coating occurred very uniformly and it was found that these compositions are very useful as an antifouling paint.

On the other hand, as is apparent from Table 20, in the case of the coating compositions containing no additive (B) (Comparative Examples 1–4), the coating was very low in consuming rate. The coating compositions using the varnish disclosed in JP-A-60-500452 (Comparative Examples 5 and 6) are also very low in coating consuming rate. Further, in the case of the coating composition disclosed in JP-A-57-92061 (Comparative Example 8), consuming of the coating occurred nonuniformly and unevenness of the coating surface became more conspicuous than before the test, resulting in an increased frictional resistance of the seawater.

Examples 81–120

To the varnish compositions produced in Examples 1–40, there were added, per 15 g of resin solids of the composition, 45 g of cuprous oxide (powder; purity: over 90%), 1 g of FLOWNON SP-1000 (produced by Kyoeisha Chemical Co., Ltd.) as dispersion-preventive and anti-sag agent, 5 g of red iron oxide (iron oxide (III)), 10 g of calcium carbonate, 5 g of 4,5-dichloro-2-n-octyl-3(2H)-isothiazoline and 4 g of xylene, and they were mixed and stirred by a homogenizer to prepare the coating compositions.

Comparative Examples 9–15

To the varnishes produced in Preparation Examples 1–7, there were added, per 15 g of resin solids of varnish, 45 g of cuprous oxide (powder; purity: over 90%), 1 g of FLOWNON SP-1000 (produced by Kyoeisha Chemical Co., Ltd.) as dispersion-preventive and antisag agent, 5 g of red iron oxide (iron oxide (III)), 10 g of calcium carbonate, 5 g of 4,5-dichloro-2-n-octyl-3(H)-isothiazoline and 4 g of xylene, and they were mixed and stirred by a homogenizer to prepare the coating compositions.

Evaluation Test Example 5

Each of the coating compositions produced in Examples 81–120 and Comparative Preparation Examples 9–15 described above was left at room temperature overnight after preparation and then spray coated on both sides of a steel plate (100×200×1 mm) which had been applied with an anticorrosive coating. Spray coating was conducted twice so that the dry coating thickness on each side would become 100 μm. The thus coated steel plates were air-dried overnight at room temperature to prepare the test plates.

Each of the test plates was fixed to a raft set in Nakaminato Port of Nakaminato City, Ibaragi Pref., and immersed in the seawater. The number of the marine organisms (barnacles) attached to each test plate was counted periodically to evaluate the antifouling performance of the coating. The results are shown in Tables 21–25.

TABLE 21

| Coating composition (Example No.) | Varnish composition (Example No.) | Antifouling performance (Number of barnacles attached to test plate) Period of immersion | | | | |
|---|---|---|---|---|---|---|
| | | 0 | 3 months | 6 months | 9 months | 12 months |
| 81 | 1 | 0 | 0 | 0 | 0 | 0 |
| 82 | 2 | 0 | 0 | 0 | 0 | 0 |
| 83 | 3 | 0 | 0 | 0 | 0 | 0 |
| 84 | 4 | 0 | 0 | 0 | 0 | 0 |
| 85 | 5 | 0 | 0 | 0 | 1 | 1 |
| 86 | 6 | 0 | 0 | 0 | 0 | 0 |
| 87 | 7 | 0 | 0 | 0 | 0 | 1 |
| 88 | 8 | 0 | 0 | 0 | 0 | 0 |
| 89 | 9 | 0 | 0 | 0 | 0 | 0 |
| 90 | 10 | 0 | 0 | 0 | 0 | 2 |

TABLE 22

| Coating composition (Example No.) | Varnish composition (Example No.) | Antifouling performance (Number of barnacles attached to test plate) Period of immersion | | | | |
|---|---|---|---|---|---|---|
| | | 0 | 3 months | 6 months | 9 months | 12 months |
| 91 | 11 | 0 | 0 | 0 | 0 | 0 |
| 92 | 12 | 0 | 0 | 0 | 0 | 0 |
| 93 | 13 | 0 | 0 | 1 | 1 | 2 |
| 94 | 14 | 0 | 0 | 0 | 1 | 1 |
| 95 | 15 | 0 | 0 | 0 | 0 | 0 |
| 96 | 16 | 0 | 0 | 0 | 1 | 2 |
| 97 | 17 | 0 | 0 | 1 | 2 | 3 |
| 98 | 18 | 0 | 0 | 2 | 2 | 4 |
| 99 | 19 | 0 | 0 | 1 | 1 | 3 |
| 100 | 20 | 0 | 0 | 0 | 2 | 2 |

TABLE 23

| Coating composition (Example No.) | Varnish composition (Example No.) | Antifouling performance (Number of barnacles attached to test plate) Period of immersion | | | | |
|---|---|---|---|---|---|---|
| | | 0 | 3 months | 6 months | 9 months | 12 months |
| 101 | 21 | 0 | 0 | 0 | 0 | 0 |
| 102 | 22 | 0 | 0 | 0 | 0 | 0 |
| 103 | 23 | 0 | 0 | 0 | 0 | 0 |
| 104 | 24 | 0 | 0 | 0 | 0 | 0 |
| 105 | 25 | 0 | 0 | 0 | 0 | 0 |
| 106 | 26 | 0 | 0 | 0 | 0 | 0 |
| 107 | 27 | 0 | 0 | 0 | 0 | 0 |
| 108 | 28 | 0 | 0 | 0 | 0 | 0 |
| 109 | 29 | 0 | 0 | 0 | 0 | 0 |
| 110 | 30 | 0 | 0 | 0 | 0 | 0 |

TABLE 24

| Coating composition (Example No.) | Varnish composition (Example No.) | Antifouling performance (Number of barnacles attached to test plate) Period of immersion | | | | |
|---|---|---|---|---|---|---|
| | | 0 | 3 months | 6 months | 9 months | 12 months |
| 111 | 31 | 0 | 0 | 0 | 0 | 0 |
| 112 | 32 | 0 | 0 | 0 | 0 | 0 |
| 113 | 33 | 0 | 0 | 0 | 0 | 0 |
| 114 | 34 | 0 | 0 | 0 | 0 | 0 |
| 115 | 35 | 0 | 0 | 0 | 0 | 0 |
| 116 | 36 | 0 | 0 | 0 | 0 | 0 |
| 117 | 37 | 0 | 0 | 0 | 0 | 0 |
| 118 | 38 | 0 | 0 | 0 | 0 | 0 |
| 119 | 39 | 0 | 0 | 0 | 0 | 0 |
| 120 | 40 | 0 | 0 | 0 | 0 | 0 |

TABLE 25

| Coating composition (Comp. Example No.) | Varnish (Preparation Example No.) | Antifouling performance (Number of barnacles attached to test plate) Period of immersion | | | | |
|---|---|---|---|---|---|---|
| | | 0 | 3 months | 6 months | 9 months | 12 months |
| 9 | 1 | 0 | 21 | 42 | 74 | 153 |
| 10 | 2 | 0 | 32 | 57 | 101 | 134 |
| 11 | 3 | 0 | 22 | 46 | 97 | 129 |
| 12 | 4 | 0 | 42 | 84 | 96 | 138 |
| 13 | 5 | 0 | 82 | 35 | 78 | 123 |
| 14 | 6 | 0 | 34 | 46 | 75 | 143 |
| 15 | 7 | 0 | 4 | 14 | 78 | 132 |

As is apparent from Tables 21–24, the coating compositions of the present invention showed excellent antifouling performance and proved to be very useful as an antifouling paint.

On the other hand, as is seen from Table 25, the coating compositions containing no additive (A) (Comparative Examples 9–12) were low in antifouling performance of the coating. The coating compositions using the varnish disclosed in WO 84/02915 (Comparative Examples 13 and 14) and the coating composition using the varnish disclosed in JP-A-58-180565 (Comparative Example 15) were also low in antifouling performance.

The coating varnish compositions and the antifouling coating compositions according to the present invention have no danger of poisoning like the organotin copolymers, show a good coating consuming property and antifouling performance comparable with the organotin copolymers and, further, are capable of forming an excellent coating which does not gel even when mixed with a copper compound.

What is claimed is:

1. A coating varnish composition comprising (A) a polymer obtained by polymerizing 1 to 50 mol % of (a) at least one unsaturated acid anhydride and 99 to 50 mol % of (b) at least one other unsaturated monomer copolymerizable therewith, and (B) at least one additive selected from the group consisting of triazole derivatives, benzothiazole derivatives, thiadiazole derivatives, polyethers and carboxylic acid anhydride derivatives in an amount of 0.01 to 50% by weight based on the weight of the polymer (A).

2. A coating varnish composition according to claim 1, wherein the unsaturated monomer (b) includes at least one compound represented by the formula:

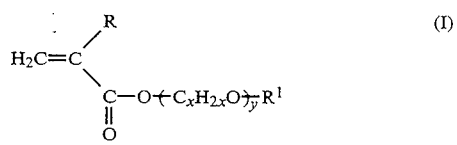

wherein R is a hydrogen atom or a methyl group; X is an integer of 1 to 6; y is an integer of 1 to 100; and $R^1$ is a straight, branched or cyclic alkyl, aryl or aralkyl group.

3. A coating varnish composition according to claim 2, wherein the polymer (A) is obtained by copolymerizing monomers comprising, based on whole amount of monomers, 1 to 50 mol % of at least one unsaturated acid anhydride (a), 0.1 to 20 mol % of at least one unsaturated monomer of the formula (I) and 98.9 to 30 mol % of at least one other unsaturated monomer other than that of the formula (I).

4. A coating varnish composition according to claim 2, wherein the polymer (A) is obtained by copolymerizing monomers comprising, based on whole amount of monomers, 10 to 40 mol % of at least one unsaturated acid anhydride, 0.5 to 15 mol % of at least one unsaturated monomer of the formula (I) and 89.5 to 45 mol % of at least one other unsaturated monomer other than that of the formula (I).

5. A coating varnish composition according to claim 1, wherein the additive (B) is at least one member selected from triazole derivatives, polyethers and carboxylic acid anhydride derivatives.

6. A coating varnish composition according to claim 1, wherein the additive (B) is at least one member selected from triazole derivatives and polyethers.

7. A coating varnish composition according to claim 1, wherein the additive (B) is at least one member selected from triazole derivatives.

8. A coating varnish composition according to claim 1, wherein the additive (B) is selected from 1,2,3-benzotriazole, 1,2,4-triazole and 3-amino-1H-1,2,4-triazole.

9. An antifouling coating composition comprising a coating varnish composition set forth in claim 1, and 1 to 500% by weight, based on whole amount of polymer solids, of an antifouling agent containing a copper compound in an amount of 50 to 100% by weight based on weight of total antifouling agent.

10. A composition according to claim 9, wherein the copper compound is at least one member selected from the group consisting of cupric chromate, cupric ferrocyanate, cupric quinoline, cupric δ-hydroquinone, cupric oleate, cupric nitrate, cupric phosphate, cupric tartarate, cuprous oxide, copper rhodanide, copper-nickel solid solution alloy, cuprous iodide and cuprous sulfite.

11. A composition according to claim 9, wherein the antifouling agent comprises 50 to 100% by weight of a copper compound and 50% by weight or less of an organic antifouling agent or an inorganic antifouling agent other than a copper compound.

* * * * *